United States Patent
Morimoto et al.

(10) Patent No.: US 7,188,304 B2
(45) Date of Patent: Mar. 6, 2007

(54) CONVERSION PROCESSING SYSTEM OF CHARACTER INFORMATION

(75) Inventors: Youiti Morimoto, Kawasaki (JP); Ken Hayashida, Kawasaki (JP); Susumu Aoyama, Kawasaki (JP); Yoshinori Yamamoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 451 days.

(21) Appl. No.: 10/413,225

(22) Filed: Apr. 15, 2003

(65) Prior Publication Data

US 2003/0233615 A1 Dec. 18, 2003

(30) Foreign Application Priority Data

Apr. 16, 2002 (JP) .............................. 2002-113800
Dec. 16, 2002 (JP) .............................. 2002-364168

(51) Int. Cl.
*G06F 15/00* (2006.01)
(52) U.S. Cl. .................... 715/501.1; 715/540; 715/810
(58) Field of Classification Search .............. 715/810, 715/540, 501.01; 704/7; 341/23
See application file for complete search history.

(56) References Cited

U.S. PATENT DOCUMENTS

| | | | |
|---|---|---|---|
| 5,786,776 A * | 7/1998 | Kisaichi et al. ............... | 341/23 |
| 5,818,437 A | 10/1998 | Grover et al. | |
| 6,011,554 A | 1/2000 | King et al. | |
| 6,307,549 B1 * | 10/2001 | King et al. ................. | 715/810 |
| 6,377,965 B1 | 4/2002 | Hachamovitch et al. | |
| 2002/0019731 A1 * | 2/2002 | Masui et al. ................... | 704/7 |

FOREIGN PATENT DOCUMENTS

| | | |
|---|---|---|
| EP | 0 732 646 | 9/1996 |
| EP | 1 035 712 | 9/2000 |
| JP | 58-161028 | 9/1983 |
| JP | 60-129875 | 7/1985 |
| JP | 63-000768 | 5/1988 |
| JP | 02-071361 | 9/1990 |
| JP | 09-114817 | 2/1997 |
| JP | WO97/05541 | 2/1997 |
| JP | 11-338858 | 10/1999 |

OTHER PUBLICATIONS

Nagao et al. "An Attempt to Computerized Dictionary Sata Base" Published 1980 Dep't of EE Kyoto University, Tokyo Japan pp. 534-542.*
Search Report for corresponding European Application No. 03252154.4 dated Nov. 2, 2005.

* cited by examiner

*Primary Examiner*—William Bashore
*Assistant Examiner*—Quoc A. Tran
(74) *Attorney, Agent, or Firm*—Staas & Halsey LLP

(57) ABSTRACT

A conversion processing system includes conversion processing which converts a conversion object into one or more conversion candidates, and performs the conversion processing related to time information. The conversion object is a letter or a symbol, for example. The system has a dictionary, a time detection part and a conversion part. The dictionary relates one or more conversion candidates corresponding to the conversion object to the time information, and stores these. The time detection part outputs the time information. When converting the conversion object into one or more conversion candidates, the conversion part refers to the time information. By this, the conversion processing can be optimized, and conversion efficiency can be improved.

23 Claims, 30 Drawing Sheets

FIG. 7

| INPUTTED CHARACTER | CONVERSION CANDIDATE |
|---|---|
| あ | 雨が |
| あ | 朝は |
| ⋮ | ⋮ |

| INPUTTED CHARACTER | CONVERSION CANDIDATE | TIME BAND |
|---|---|---|
| あ | 明日 | NIGHT |
| あ | 遊ぶ | NIGHT |
| あ | 朝帰り | MIDNIGHT |
| あ | 朝寝坊 | MORNING |
| あ | 後でね | NOON |
| ⋮ | ⋮ | ⋮ |

FIG. 8(b)

|   | TIME BAND | TIME |
|---|---|---|
| 1 | MORNING | 5:00〜10:59 |
| 2 | NOON | 11:00〜16:59 |
| 3 | NIGHT | 17:00〜22:59 |
| 4 | MIDNIGHT | 23:00〜4:59 |

FIG. 9

| INPUTTED CHARACTER | READING | CONVERSION CANDIDATE |
|---|---|---|
| あ | あしたか | 愛　鷹 |
| ⋮ | ⋮ | ⋮ |

| INPUTTED CHARACTER | CONVERSION CANDIDATE | |
|---|---|---|
| あ | 亜 | |
| あ | ア | |
| ⋮ | ⋮ | ⋮ |

9

CONVERSION PROCESSING SYSTEM OF CHARACTER INFORMATION

BACKGROUND OF THE INVENTION

1. Field of the Invention

The present invention relates to information processing which is applied to a device, such as a character input processing device and a mobile telephone, showing one or more conversion candidates of a character string including an inputted character. In more particular, it relates to a character information conversion processing system which performs predictive conversion of a character string and conversion processing related to time information. In the present invention, a letter, a symbol, an element of a letter or a symbol, or a combination of these is used as a conversion object.

2. Description of the Related Art

In a conventional information processing terminal, such as a portable or mobile telephone, a necessary character for conversion is inputted by using keys to which characters and symbols are assigned, and thereby a desired character string is designed to be given to a user. For example, in the case of inputting a text of e-mail to the mobile telephone, when a conversion key is pressed after input of a character with a key, one or more character strings (Kant-Kant mixture sentences) including the character in a head, which have been inputted before and have been stored, are fetched from a dictionary to display in order. And, a decision key is pressed when the desired character string is displayed. By this, quick input of a desired character string is designed to be performed by means of decreasing the number of times of key input.

As an information processing technology of this kind, patent documents 1 to 12 are in existence.

[Patent Document 1]
The Japanese Patent Laid Open Publication No.2-71361
[Patent Document 2]
The Japanese Patent Laid Open Publication No.63-768
[Patent Document 3]
The Japanese Patent Laid Open Publication No.11-338858
[Patent Document 4]
The Japanese Patent Laid Open Publication No.9-114817
[Patent Document 5]
The Japanese Announcement Patent Publication No.2000-508093
[Patent Document 6]
The U.S. Pat. No. 5,818,437
[Patent Document 7]
The U.S. Pat. No. 6,011,554
[Patent Document 8]
The U.S. Pat. No. 6,307,549
[Patent Document 9]
The U.S. Pat. No. 5,109,352
[Patent Document 10]
The Japanese Patent Laid Open Publication No.2-154519
[Patent Document 11]
The U.S. Pat. No. 5,187,480
[Patent Document 12]
The Japanese Announcement Patent Publication No.4-502223

The patent document 1 discloses that a sentence is compounded from an inputted word and time information of a timer, and a result of that is displayed on a CRT. The patent document 2 discloses that a next paragraph which is inputted is predicted by interpreting a meaning of a paragraph which is inputted previously, and the next paragraph is presented. The patent document 3 discloses that character strings of Japanese and other language such as English are predicted simultaneously from an inputted character string, and predictive candidates of those are presented. The patent document 4 discloses that one or more words of a character string capable of following after an inputted character string are predicted and are displayed. Thereby, troublesomeness of a selective operation is designed to be reduced. The patent documents 5 to 8 disclose a reduced keyboard using word level disfiguration to resolve ambiguities in keystrokes. The patent documents 6 to 8 are the U.S. Patent Applications corresponding to the invention disclosed in the patent document 5. The patent documents 9 and 10 disclose a system for encoding a collection of ideographies characters. The patent document 10 is the Japanese Patent Application corresponding to the patent document 9. The patent documents 11 and 12 disclose a symbol definition apparatus for forming many kinds of symbols including Chinese characters by using a keyboard. The patent document 12 is the Japanese Patent Application corresponding to the patent document 11.

By the way, in conventional predicative conversion which converts an inputted character into a character string, a history in which information inputted in the past is recorded is referred in the predictive conversion, and an inputted character is preferentially converted into a character string used immediately before the above inputted character, or into a character string having a higher frequency of use. Because of this, sometimes it is difficult for some users to use the input conversion processing.

There is a greeting as a phrase used frequently. For example, a phrase, such as "good morning" and "good night", is used in accordance with time. When the conversion is performed by referring to only the inputted history, sometimes a gap occurs between a phrase and time of the conversion. Hence, if the gap between the phrase and the time is larger, the number of times of key operations increases and a conversion efficiency of a character may fall.

In a character conversion like this, the patent document 1 compounds a sentence from the inputted word and the time information of the timer and nothing more. The patent documents 2 to 4 predict other character string from the inputted character string and nothing more. The patent documents 5 to 8 discloses the reduced keyboard using word level disfiguration to resolve ambiguities in keystrokes and nothing more. The patent documents 9 to 12 are a technique in connection with forming of symbols including characters and nothing more. Therefore, even if the techniques disclosed in the patent documents 1 to 12 are used, it is impossible to improve the fall of conversion efficiency due to a gap of a phrase caused by a time at the time of conversion.

SUMMARY OF THE INVENTION

The present invention relates to information processing which converts a conversion object including a letter into one or more conversion candidates. An object of the present invention is to optimize a conversion result by relating time information to conversion processing, and is to improve conversion efficiency.

Constitution of an information processing device, an information processing method, an information processing program, and a program product containing the information processing program according to the present invention solving the above problems is as described below.

The information processing device includes dictionaries including a history dictionary 6, a time dictionary 7, a user registration dictionary 8 and a basic dictionary 9, a time detection part (the time dictionary 7) and a conversion part 3. The dictionaries have a letter, a symbol, an element of a letter or a symbol, or a combination not less than two of these as a conversion object. The dictionaries relate one or more conversion candidates corresponding to the conversion object to time information, and store these. In the conversion object, "a letter" is language, and includes the Japanese Kant, Hiragana, Katakana and Roman letter, the Korean language, the Chinese language, the Alphabet of English and so on. "A symbol" includes a sign and so on except for a letter. "An element of a letter or a symbol" is a part of a letter and a symbol. For example, in Kanji, its element is a portion of Kant such as "hen (偏)" and "tsukuri (旁)" in Kant, and in "A" of the Alphabet, its element is "Λ" and so on. "A combination not less than two of these" is a combination not less than two things which are selected from a letter, a symbol and an element of a letter or a symbol, and indicates a composite of letters, symbols, a letter and a symbol, a combination of elements of a letter or a symbol, and so on. The conversion object is related to one or more conversion candidates, and is information which gives a clue for taking out one or more conversion candidates. And, "relating to the time information" indicates that a conversion candidate including a time element, such as a conversion candidate representative of a greeting like "good morning", is associated to the time information representative of morning as an example. In addition, an item "character" used in explanation of the present invention includes a letter, a symbol, an element of a letter or a symbol, and a combination not less than two of these, and may use any language.

The time detection part is constructed by a watch as an example, and outputs the time information representative of a detected time. In this case, the time detection part may output the time information based on time inputted from outside.

The conversion part receives the conversion object, and performs processing which relates one or more conversion candidates to the time information and converts the conversion object into one or more conversion candidates by referring to the dictionaries. Processing in the conversion part includes that one or more conversion candidates are read-out from the dictionaries by recognizing the conversion object, or by recognizing indication of conversion together with a recognition of the conversion object. Therefore, since a conversion candidate is stored in the dictionaries related to the time information, the conversion part can fetch one or more conversion candidates from the dictionaries by referring to the time information at the time of conversion, when the conversion part recognizes the conversion object. In this case, as the time information, instead of the time information which is outputted to the conversion part from the time detection part, time information which is inputted by a user may be use. In this case, although a relation between a conversion candidate and the time information is attached importance, the conversion processing from the conversion object to a conversion candidate should not be interpreted that read-out of conversion candidates except for a conversion candidate in association with the time information is prohibited.

Thus, according to the information processing device having the dictionaries, the time detection part and the conversion part, the information processing device receives a letter, a symbol, an element of a letter or a symbol, or a combination not less than two of these as the conversion object, refers to the time information from the time detecting part, and gives one or more conversion candidates. A user can obtain a desired conversion result by selecting an optional conversion candidate. For example, in a sentence for greeting, an optimum conversion result which a user expects or predicts is outputted. Thereby, the conversion processing becomes quick, and a converting operation is made simple.

The information processing method of the present invention includes a step which recognizes a conversion object, a step which recognizes time information, and a step of conversion processing.

(1) In the step which recognizes the conversion object, processing which recognizes the conversion object is performed. The conversion object is a letter, a symbol, an element of a letter or a symbol, or a combination not less than two of these.

(2) In the step which recognizes the time information, processing which recognizes the time information representative of time of the conversion or representative of an optional time inputted is performing.

(3) In the step of the conversion processing, by referring to dictionaries which relate one or more conversion candidates corresponding to the conversion object to the time information and stores these, processing which relates one or more conversion candidates corresponding to the conversion object to the time information and converts the conversion object into one or more conversion candidates is performed.

According to the information processing method, one or more conversion candidates corresponding to the conversion object are related to the time information and are fetched. By this, since a conversion result according to the time information can be obtained, the conversion can be optimized and conversion efficiency can be improved.

The information processing method of the present invention includes the step which recognizes the conversion object, the step which recognizes the time information, and the step of the conversion processing. In the conversion processing, in the case that one or more conversion candidates corresponding to the conversion object are related to the time information and are converted, processing which changes order of one or more conversion candidates according to the time information is performed.

According to this information processing method, since the order of one or more conversion candidate is changed according to the time information representative of the time of the conversion, a user can change to a priority order which the user wants. Because of this, as compared with a predictive conversion referring to only an input history, a conversion result can be optimized and conversion efficiency can be improved.

The information processing method of the present invention includes the step which recognizes the conversion object, the step which recognizes the time information, and the step of the conversion processing. In the conversion processing, processing which modifies a relation between the time information and a conversion candidate is performed. That is, since a time band of life differs with persons, it is desirable that a greeting can be changed according to a time band of life of a user. Therefore, if the relation between the time information and a conversion candidate is changed according to a time band of life decided from a conversion candidate at time of the conversion, an optimum conversion result according to prediction or expectation of a user can be obtained. By performing this processing, a problem of the gap between a character string representative of a greeting and a time band of life is solved. Because of this, a conversion result can be optimized, and the conversion efficiency can be improved.

The information processing program of the present invention includes a function which recognizes a conversion object, a function which recognizes a time information, and a function of conversion. The conversion object is a letter, a symbol, an element of a letter or a symbol, or a combination not less than two of these. The function of the conversion relates one or more conversion candidates corresponding to the conversion object to the time information and converts the conversion object into one or more corresponding conversion candidates, by referring to dictionaries in which one or more conversion candidates corresponding to the conversion object are stored in associated with the time information. This information processing program is a program which makes the information processing device realize the information processing method. According to this information processing program, one or more conversion candidates corresponding to the conversion object are related to the time information and are fetched. By this, since a conversion result according to the time information can be obtained, the conversion can be optimized and conversion efficiency can be improved.

The program product of the present invention stores the information processing program, which makes the information processing device realize the information processing method, in a computer readable medium. That is, the program product includes the function which recognizes the conversion object, the function which recognizes the time information, and the function of the conversion. The conversion object is a letter, a symbol, an element of a letter or a symbol, or a combination not less than two of these. The function of the conversion relates one or more conversion candidates corresponding to the conversion object to the time information and converts the conversion object into one or more corresponding conversion candidates, by referring to the dictionaries which relate one or more conversion candidates corresponding to the conversion object to the time information and stores these. That is, this information processing program is a program which makes the information processing method realize the information processing device.

Therefore, according to this program product of the present invention, one or more conversion candidates corresponding to the conversion object are related to the time information and are fetched, through the information processing device. By this, since a conversion result according to the time information can be obtained, the conversion can be optimized and conversion efficiency can be improved.

BRIEF DESCRIPTION OF THE DRAWINGS

The foregoing and other objects, features and attendant advantages of the present invention will be appreciated as the same become better understood by means of the following description and accompanying drawings wherein:

FIG. 7 is a drawing showing contents of registration in a history dictionary;

FIG. 8(*a*) is a drawing showing contents of registration in a time dictionary;

FIG. 8(*b*) is a drawing showing the range of time bands in the time dictionary;

FIG. 9 is a drawing showing contents of registration in a user registration dictionary;

FIG. 10 is a drawing showing contents of registration in a basic dictionary;

FIG. 12(*b*) is a front view showing a PDA as an information processing device representative of the first embodiment according to the present invention;

DETAILED DESCRIPTION OF THE PREFERRED EMBODIMENTS (First Embodiment)

Figure 1:
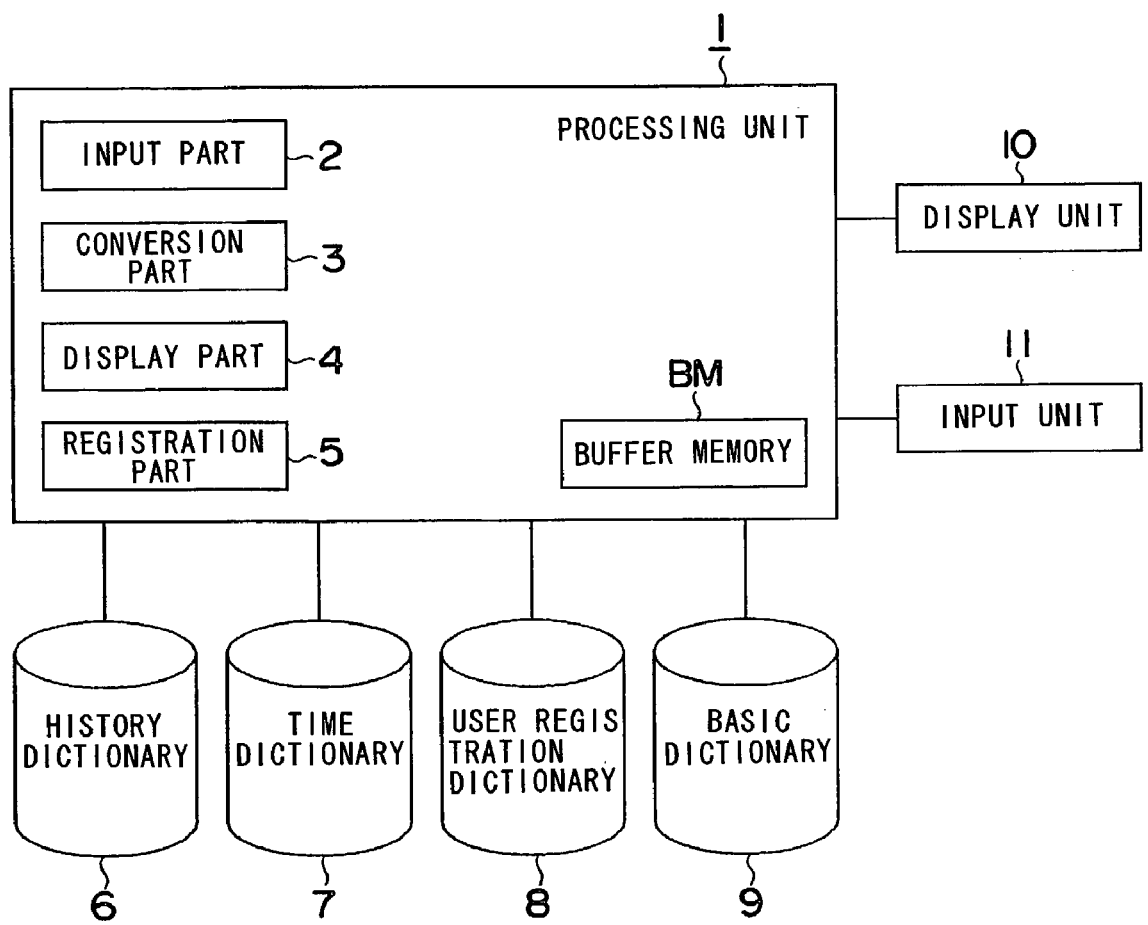
FIG. 1 is a block diagram showing a processing system representative of a first embodiment of an information processing device, an information processing method, an information processing program and a program product containing the information processing program according to the present invention.

FIG. 1 shows a processing system as a first embodiment of an information processing device, an information processing method, an information processing program, and a program product containing the information processing program according to the present invention.

The processing system has a processing unit 1 constituted by a computer. The processing unit 1 is an information processing device performing processing which converts an inputted character into other character string. The processing unit 1 executes various processings includes a character conversion processing in accordance with a processing program. For example, the processing unit 1 executes information processing which converts a conversion object into one or more conversion candidates. At this, the conversion object is a letter, a symbol, an element of a letter or a symbol, or a combination not less than two of these. And, language of the conversion object may use any language. For example, the Japanese language, the English language, the Chinese language and the Korean language can be used. One or more candidates are one or more character strings in optional language related to the conversion object and time information. The time information is information representative of a time in 24 hours or a time band. Now, in order to realize the conversion processing, the processing unit 1 includes an input part 2, a conversion part 3, a display part 4, a registration part 5 and a buffer memory BM. Constitution of these is realized by a computer which constitutes the processing unit 1. The input part 2, the conversion part 3, the display part 4 and the registration part 5 are constituted by CPU (Central Processing Unit) performing the information processing, RAM (Random Access Memory) and ROM (Read Only Memory). As a memory unit of RAM, ROM and so on, an internal memory and/or an external memory can be used. As a computer readable medium which makes the processing unit 1 realize various information processing including an input processing, a conversion processing and a decision processing, a magnetic disc and an optical disc such as CD-ROM (Compact Disc Read Only Memory) and FD (Floppy Disc) can be used, for example. Further, in this processing system, a history dictionary 6, a time dictionary 7, a user registration dictionary 8 and a basic dictionary 9 are provided as a dictionary data base, and a display unit 10 and an input unit 11 are provided as an input-output processing device. The time dictionary 7 together with a time counting part such as a watch constitutes a time detecting part. The time counting part is included in the processing unit 1.

Figure 2:
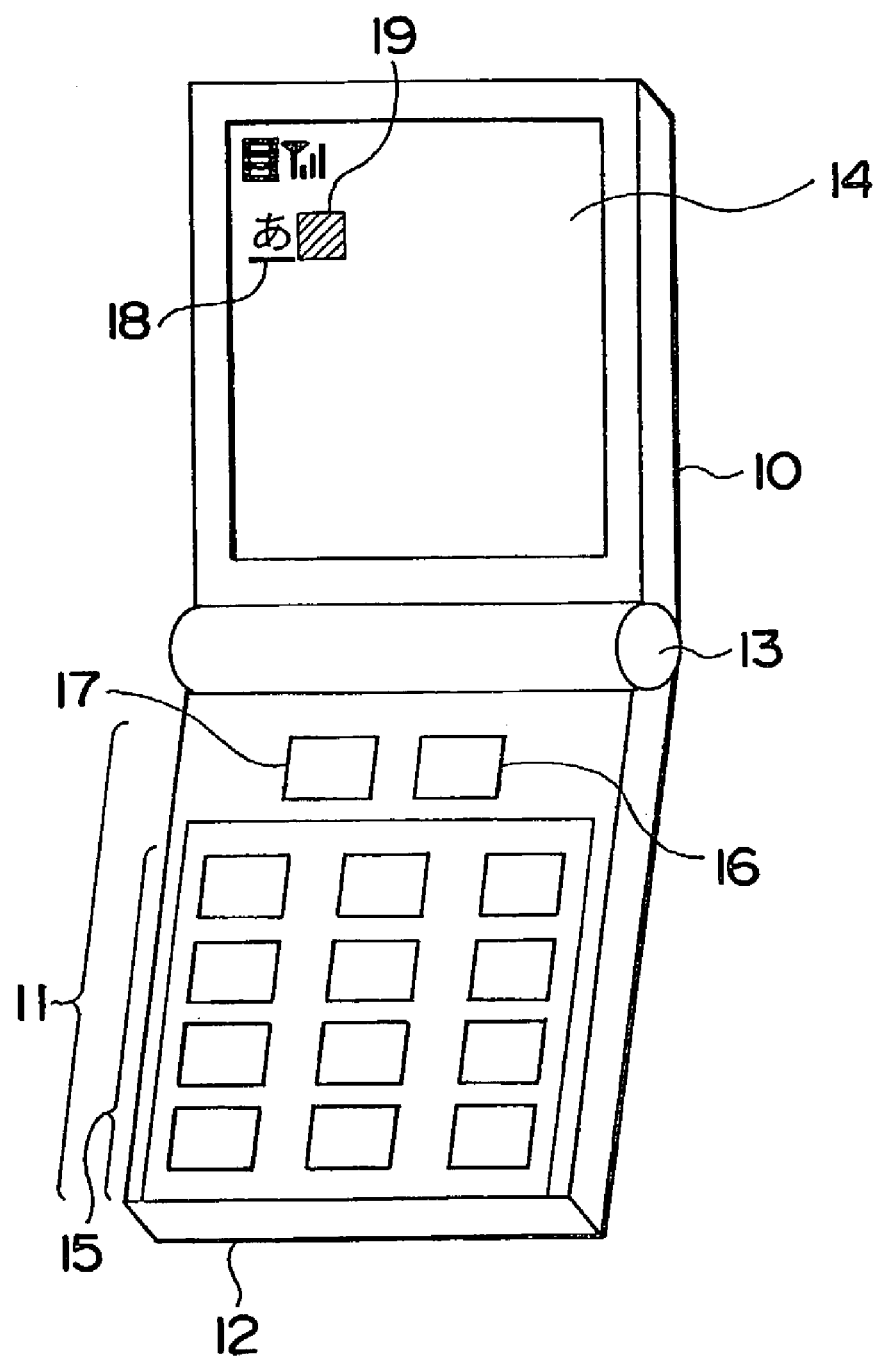
FIG. 2 is a perspective view showing a mobile telephone.

In the processing unit 1, the input part 2 takes in a character inputted from the input unit 11, and gives information to a display region 14 (FIG. 2) namely a input field 14 of the display unit 10. The conversion part 3 retrieves the history dictionary 6, the time dictionary 7, the user registration dictionary 8 or the basic dictionary 9 in respect to the inputted character, and converts the inputted character into other character strings as conversion candidates or conversion results. The display part 4 displays character strings and a cursor on the display region 14 (FIG. 2). The displayed character strings are representative of one or more conversion candidates and conversion results obtained by the conversion part 3. At this, a conversion candidate is representative of conversion information in the middle of the processing for getting a conversion result, and it is one state of a conversion result. If a conversion candidate is defined like this, a conversion result is to indicate one or more character strings of conversion candidates selected by the information processing or selected by a user. The registration part 5 registers a character or a character string in the history dictionary 6, the time dictionary 7 or the user registration dictionary 8. In addition, an item "character" used in explanation of the present invention includes a letter, a symbol, an element of a character or a symbol, and a combination not less than two of these, and may use any language.

The history dictionary 6 is a memory part which stores information used before by a user. The history dictionary 6 registers various information from a registration, conversion and input processing in the processing unit 1. For example, an inputted character is displayed on the display region 14 (FIG. 2), and after the conversion processing to one or more conversion candidates, a character string (ex. Kana character string, Kana-Kanji character string) decided by pressing a decision key is registered. The time dictionary 7 stores time information and one or more conversion candidates corresponded to a character. The time dictionary 7 outputs the time information necessary for the information processing of the processing unit 1. In this case, the time information represents time or a time band.

In the user registration dictionary 8, a user corresponds a conversion candidate and a conversion result to a character and registers a conversion candidate and a conversion result. The user registration dictionary 8 registers one or more conversion candidates and conversion results corresponding to the conversion object as various information from the registration, conversion and input processing in the processing unit 1. In the basic dictionary 9, one or more conversion candidates and conversion results corresponding to an inputted character are stored beforehand. The display unit 10 is an information presenting device such as a Liquid Crystal Display, and displays an inputted character, a conversion result and so on. The input unit 11 is constituted by a keyboard and so on, and the conversion object such as a letter or a symbol is inputted.

This processing system is applied to a mobile telephone as an example. As shown in FIG. 2, this mobile telephone is foldaway. A display unit 10 is provided to a telephone body 12 by way of a hinge 13 so that the display unit 10 can be folded up. In the display unit 10, the input field 14 which is a display region and an input region for a character is formed. In the telephone body 12, as the input unit 11, a plurality of character keys 15 arranged in lines-by-lines array, a conversion key 16, a decision key 17 and so on are provided. In the character keys 15, for example, in the case of keys corresponding to the Japanese language, the Hiragana "あ (a)" through "ん (n)", Arabic numerals, the alphabet are assigned to the character keys 15. In the case of keys corresponding to the Korean language, a consonant, a vowel, a batchim and so on are assigned to the character keys 15. The batchim is a portion of a character in the Korean language, is located at the lowermost portion in the character, and supports the whole of the character. In the case of keys corresponding to the English and Chinese languages, the alphabet, Arabic numerals and so on assigned to the character keys 15. In the input field 14, for example, an inputted character 18, a cursor 19, a conversion result and its candidates are displayed.

According to the above constitution, in the conversion processing of the conversion part 3, the dictionaries including the time dictionary 7 are retrieved based on time of input of a character. Then, one or more conversion candidates including the inputted character are fetched in order starting from the time information representative of the inputted time. Further, one or more character candidates are displayed in order of fetch on the display part 4. In this case, the conversion part 3 performs the processing including the input of the conversion object, Kana-Kanji conversion and a decision of a character string by pressing the decision key 17, and the conversion object or a conversion candidate is selected.

The registration part 5 registers a conversion candidate and a conversion result corresponded to a character in a head of a character string, into the user registration dictionary 8, and registers the time information representative of the time of its conversion into the time dictionary 7. That is, conversion candidates or conversion results related to the conversion object and the time information are recorded. In the history dictionary 6, a history information is stored.

Time namely the time information relating to a conversion candidate, for example, is divided into four time bands of morning, noon, night and midnight. A time width of one division can be modified. It is possible to divide a day into twenty-four divisions at one hour intervals. It is also possible to divide into two divisions of noon and night. The number of time divisions is optional.

One or more conversion candidates corresponded to an inputted character 18 as the conversion object are related to the time information and are stored in the time dictionary 7 and the user registration dictionary 8. Therefor, by referring to the inputted character 18 and the time information, character strings as conversion candidates or conversion results corresponding to the inputted character 18 can be display in accordance with the time information. Conversion candidates according to prediction of a user can be obtained, a conversion result can be optimized and the conversion efficiency can be improved.

In the first embodiment, the information processing device of the present invention is constituted as the processing system having the processing unit 1, various dictionaries 6–9, the display unit 10 and the input unit 11. In this processing system, the information processing method and the information processing program of the present invention are realized. That is, the information processing method realized in this processing system, for example, (1) a step which recognizes the conversion object, (2) a step which recognizes the time information, and (3) a step of the conversion processing.

Specifically, in the step which recognizes the conversion object, a letter, a symbol, an element of letter or symbol, or a combination not less than two of these is set as the conversion object, and processing which recognizes the conversion object is performed. In the step which recognizes the time information, processing, in the information processing device, which recognizes the time information representative of the time of conversion or representative of an optional time inputted is performing. In the step of the conversion processing, by referring to a dictionary which relates one or more conversion candidates corresponding to the conversion object to the time information and stores these, processing which relates one or more conversion candidates corresponding to the conversion object to the time information and converts the conversion object into one or more conversion candidates is performed. Furthermore, the program product for realizing the above processing can be constituted.

Figure 3:
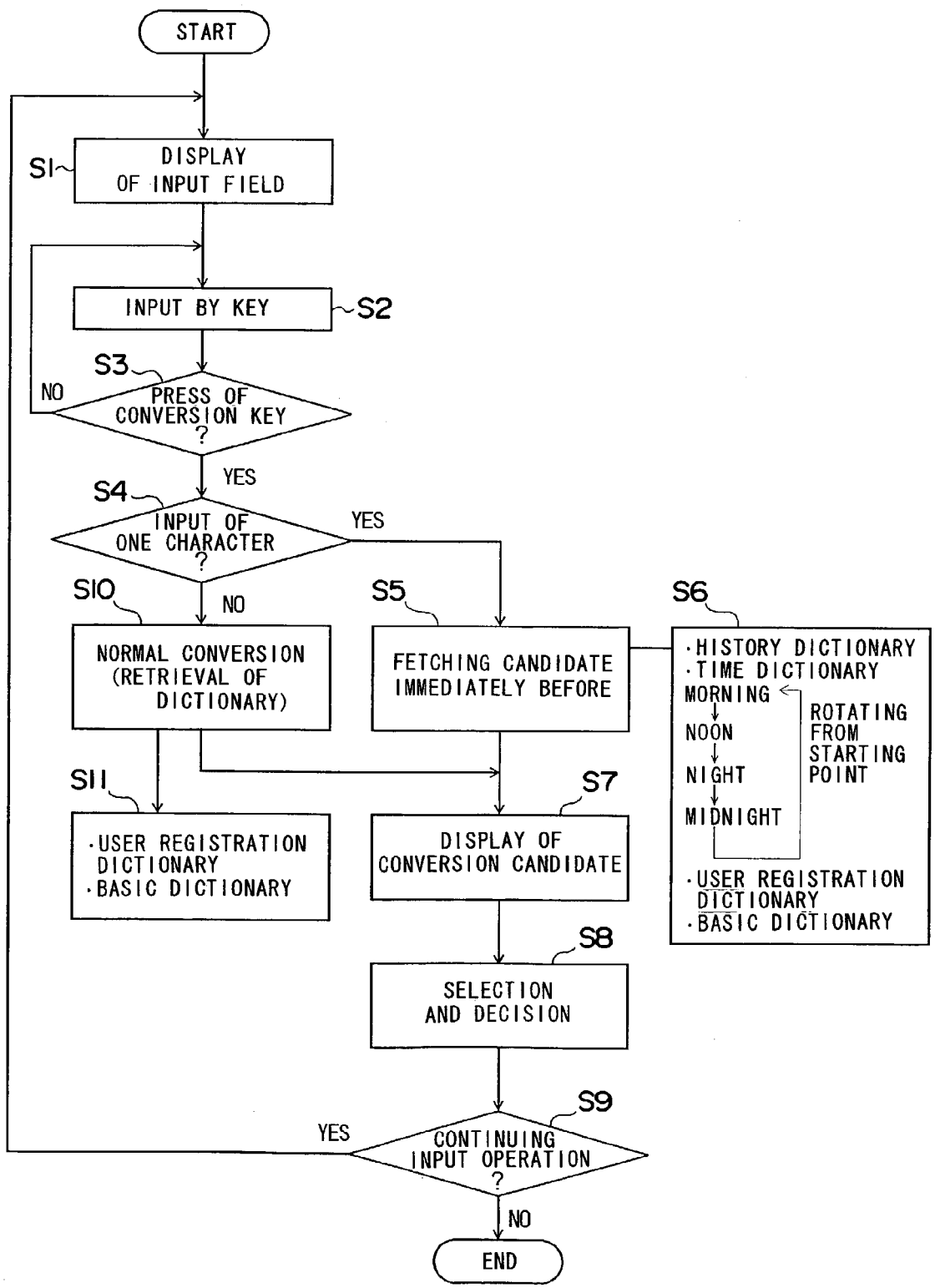
FIG. 3 is a flow diagram showing processing representative of a first embodiment of an information processing device, an information processing method, an information processing program and a program product containing the information processing program according to the present invention.

The above processing is explained by using a flow diagram of FIG. 3. The flow diagram shown in FIG. 3 shows processing of the first embodiment of the information processing device, the information processing method, the information processing program and the program product containing the information processing program according to the present invention.

In this flow diagram, before a starting of the conversion processing, the input field (the display region) 14 is displayed at a step S1. That is, in the mobile telephone shown in FIG. 2, the input field 14 is displayed on the screen of the display unit 10, for example. After this display, at a step S2, input is performed by using the character keys 15 in order to designate the conversion object. In this case, positioning of the cursor 19 is performed by moving the cursor 19 at the input field displayed at the step S1. After this positioning, the input of a character is performed by pressing the character keys 15. As an inputted character, for example, "あ (a)" is inputted.

In this embodiment, after the input of the character namely the conversion object, indication of the conversion is performed. This indication of the conversion is executed at a step S3. At the step S3, whether or not the conversion key 16 is pressed is decided. This decision processing becomes the conversion indication. On condition that the character "あ (a)" is displayed on the input field 14, whether or not the conversion key 16 is pressed is decided. If the conversion key 16 is pressed, the system enters from the step S3 to a step S4. If the conversion key 16 is not pressed, the system returns from the step S3 to the step S2 because the indication of the conversion is not given, and an input operation of a new character can be repeated in the input field 14.

In this embodiment, whether or not to refer to the time information is decided based on the number of inputted characters. That is, at the step S4, whether or not the number of inputted characters is one character is decided. When the conversion key 16 is pressed, at the step S4, whether or not the number of inputted characters in the input field 14 is one character is decided. When the number of inputted characters is one character, the dictionaries are retrieved by referring to the time information. When the number of inputted characters is characters not less than two, a normal retrieval is performed without referring to the time information. Therefore, if the number of inputted characters is one character, the system enters from the step S4 to a step S5. If the number of inputted characters is not one character, the system enters from the step S4 to a step S10.

At the step S5, one or more conversion candidates are fetched by referring to the time information corresponding to the time of the conversion. This processing is performed as shown in a step S6.

(a) the history dictionary 6
(b) in order starting from a time band receiving the input of a character from morning, noon, night and midnight of the time dictionary 7
(c) the user registration dictionary 8
(d) the basic dictionary 9

As shown in the step S6, in this processing, conversion candidates are fetched in order of (a), (b), (c) and (d), and conversion candidates are formed from the head. At a step S7, a plurality of conversion candidates formed are displayed on the display unit 10, and a user can recognize these contents visually.

At a step S8, a desired conversion candidate is selected from a plurality of conversion candidates, and the selected conversion candidate can be decided as a conversion result. In this case, a user selects one of conversion candidates displayed on the display unit 10 by moving the cursor 19. After that, the user decide a selected conversion candidate by pressing the decision key 17. By this, the decided conversion candidate is set to the input field 14. In this case, even if the user moves the cursor 19, the selected conversion candidate is not decided when the decision key 17 is not pressed. The user moves the cursor 19 again, and can select another conversion candidate.

After the conversion candidate is decided, the system enters from the step S7 to a step S9, and at the step S9, whether or not the input processing is continued is decided. This decision, for example, can be performed based on whether or not the decision key 17 is operated again. Therefore, when another input is not performed after the conversion candidate is decided, the system returns from the step S9 to the step S1, and the input and conversion processing is repeated. For example, if the decision key 17 is operated again, this processing is terminated.

By the way, when characters not less than two are inputted in the input field 14, its processing is performed at a step Sio. In this case, if the conversion key 16 is pressed, the system enters from the step S10 to a step S11. At the step S11, as a normal conversion processing, read-out of corresponding conversion candidates is performed in order of the user registration dictionary 8 and the basic dictionary 9, and after that, at the step S7, these conversion candidates are displayed. One or more conversion candidates can be decided by pressing the decision key 17 at the step S8, and results of these are displayed as conversion results on the display unit 10.

In the normal conversion processing, the system also enters to the step S9. At the step S9, whether or not the input processing is continued is decided. This decision, for example, can be performed based on whether the decision key 17 is operated again. Therefore, when another input is not performed after a conversion candidate is decided, the system returns from the step S9 to the step S1, and the input and conversion processing is repeated. For example, if the decision key 17 is operated again, this processing is terminated.

Figure 6:
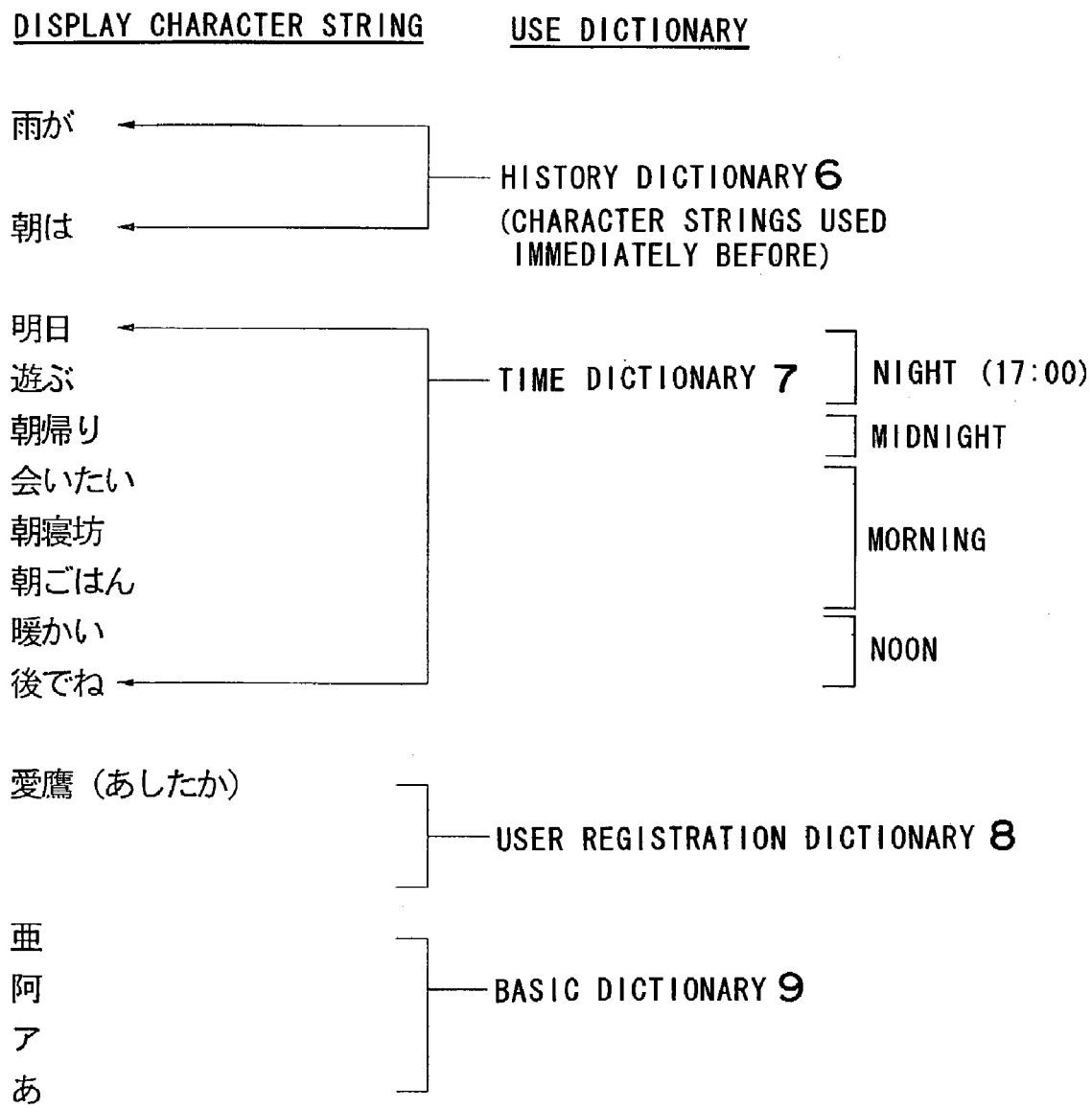
FIG. 6 is a drawing showing a relation between display character strings and use dictionaries.

Like this, when a user presses the conversion key 16 under the state that one character is inputted in the input field 14, that is, when the "yes" branch is realized at the step S4, the following processing is performed. First, conversion candidates are fetched from the history dictionary 6. Next, conversion candidates are fetched in order, with the time information representative of a time band corresponding to the time of the input as a momentum, from the time dictionary 7. Next, conversion candidates are fetched from the user registration dictionary 8. Next, conversion candidates are fetched from the basic dictionary 9. The fetched conversion candidates are displayed in order of the history dictionary 6, the time dictionary 7, the user registration dictionary 8 and the basic dictionary 9 (ex. FIG. 6). A user selects from these conversion candidates, or a user selects from a conversion candidate which is displayed in order, and a decided conversion candidate is set to the input field 14 by pressing the decision key 17. Therefore, since optimum conversion candidates can be displayed with the time information representative of the time of the input of a character as a momentum, optimum conversion candidates corresponding to the time information is preferentially displayed, and conversion efficiency can be improved.

Figure 4:
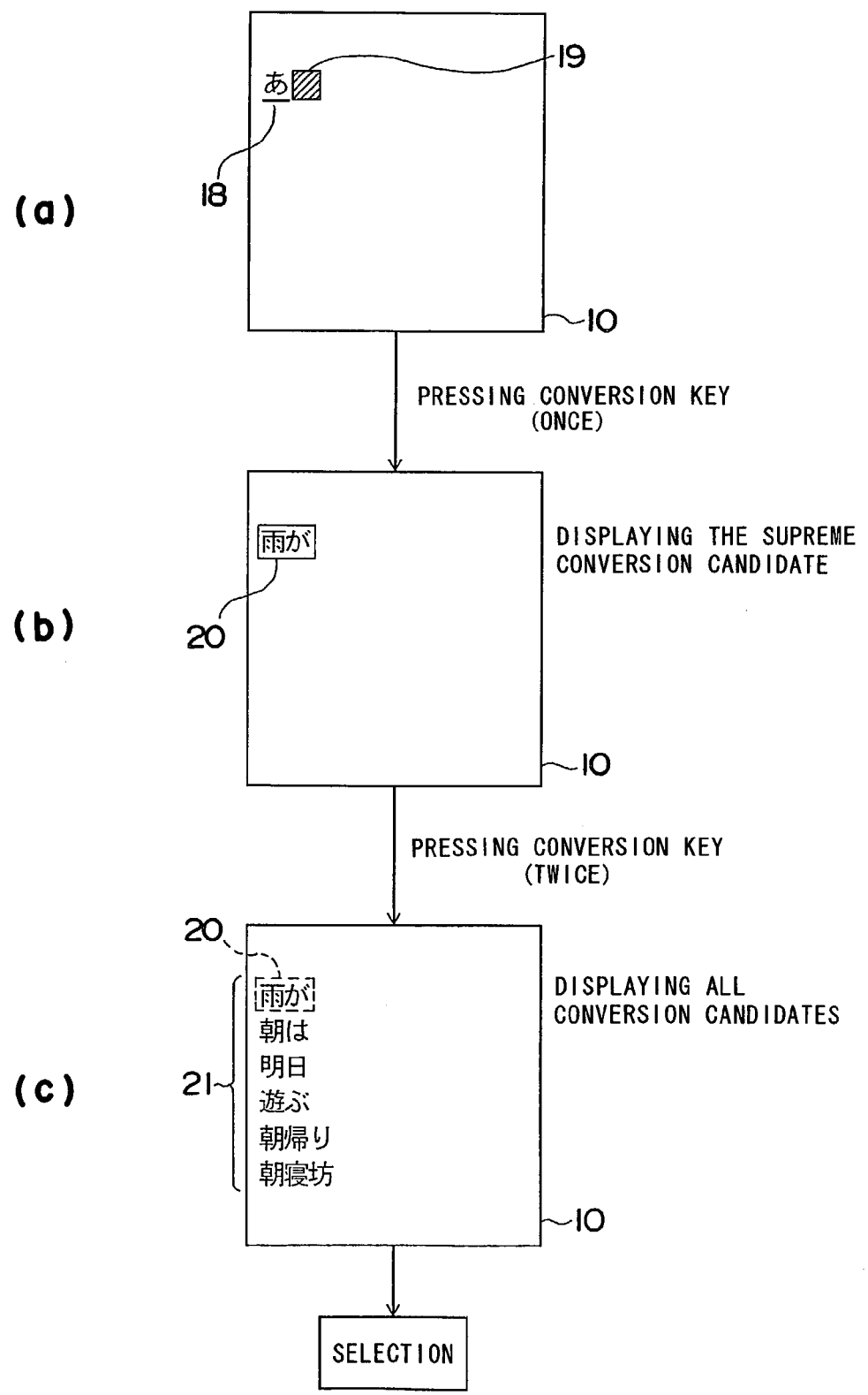
FIG. 4 is a drawing showing a display change on a screen of a display unit.

An example of display in the above conversion processing is shown in FIG. 4. FIG. 4 is an example of display on the screen of the display unit 10. FIG. 4(*a*) shows display of "あ" (a) which is an inputted character 18 as the conversion object. The cursor 19 displayed next of the inputted character "あ(a)" indicates a next input location.

When the conversion key 16 is pressed at once under the state of this display, as shown in FIG. 4(*b*) as an example, a character string "雨が (amega) (the rain)" is displayed as a supreme conversion candidate 20. The letters (amega) in the character string "雨が (amega) (the rain)" is the Japanese Roman letters (this will be used in the rest in a similar manner). In FIG. 4(*b*), the character string "雨が (amega) (the rain)", which is the supreme conversion candidate 20 of conversion candidates including the inputted character "あ" (a) of FIG. 4(*a*) at head (that is, at the step 5 in FIG. 3), is displayed.

When the conversion key 16 is pressed at twice under the state of this display, as shown in FIG. 4(*c*) as an example, all of conversion candidates 21 are displayed with the supreme conversion candidate 20 at head. All of the conversion candidates 21 displayed are character strings including the inputted character "あ(a)" of FIG. 4(*a*) at head (at the step S7 in FIG. 3). All of the conversion candidates are as follows.

雨が(amega) (the rain)
朝は(asawa) (in the morning)
朝日(asahi) (the morning sun)
遊ぶ(asobu) (play)
朝帰り(asagaeri) (come home early morning)
朝寝坊(asanebou) (a late riser)

As mentioned above, if the supreme conversion candidate 20 or all of the conversion candidates 21 given at the step S7 of the flow diagram in FIG. 3 are displayed on the screen, the supreme conversion candidate 20 or all of the conversion candidates 21 are displayed in order according to the time information.

Figure 5:
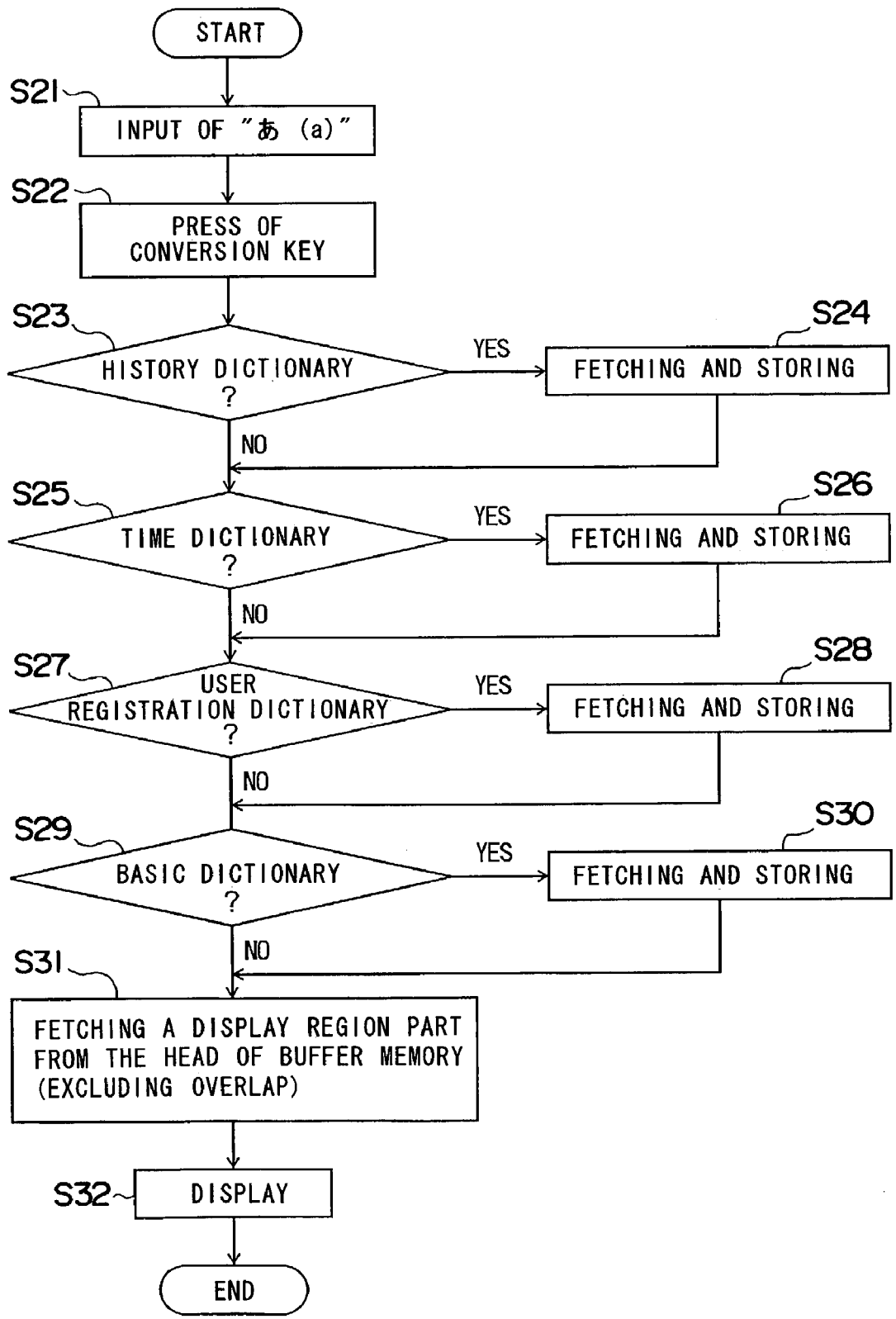
FIG. 5 is a flow diagram showing conversion processing.

The conversion part 3 of the processing unit 1 according to this embodiment includes an order changing part which changes order of conversion candidates according to the time information of the time of the conversion of the conversion object. Therefore, the conversion processing which changes the order of conversion candidates according to the time information is explained by referring to a flow diagram in FIG. 5. The flow diagram shown in FIG. 5 shows processing of the information processing device, the information processing method, the information processing program and the program product containing the information processing program according to the present invention.

At a step S21, for example, "あ(a)" as an input character of the conversion object is inputted by pressing the keys 15. In this case, the cursor 19 is moved to a desired position in the input field 14. If the input character "あ(a)" is inputted at a position of the cursor 19 by pressing the character keys 15, the inputted character "あ(a)" is displayed.

At a following step S22, when the conversion key 16 is pressed under the state that the inputted character "あ(a)" is displayed in the input field 14, the system enters from the step S22 to a step S23. At the step S23, whether or not one or more conversion candidates exist in the history dictionary 6 is decided. That is, when the conversion key 16 is pressed at the step S22, in the history dictionary 6, whether or not one or more registrations {or one or more character strings (Hiragana sentence, Kana-Kanji mixture sentence) with the inputted character "あ(a)" at head} corresponded to the inputted character "あ(a)" are in existence is decided. If one or more corresponding registrations exist, the system enters from the step S23 to a step S24. At the step S24, corresponding registrations are fetched in order of candidates from the history dictionary 6, and fetched registrations are stored from its head into the buffer memory BM. After that, the system enters from the step S24 to a step S25. If the corresponding registrations do not exist, the system directly enters from the step S23 to the step S25.

At the step S25, whether or not one or more conversion candidates exist in the time dictionary 7 is decided. That is, in the time dictionary 7, whether or not one or more registrations {or one or more character strings (Hiragana sentence, Kana-Kanji mixture sentence) with the inputted character "あ(a)" at head} corresponding to the inputted character "あ(a)" are in existence is decided. If the corresponding registrations exist, the system enters from the step S25 to a step S26. At the step S26, the one or more corresponding registrations are fetched in order of candidates from the time dictionary 7, and the fetched registrations are stored into the buffer memory BM. After that, the system enters from the step S26 to a step S27. If a corresponding registration does not exist in the time dictionary 7, the system directly enters from the step S25 to the step S27.

At the step S27, whether or not one or more conversion candidates exist in the user registration dictionary 8 is decided. That is, in the user registration dictionary 8, whether or not one or more registrations {or one or more character strings (Hiragana sentence, Kana-Kanji mixture sentence) with the inputted character "あ(a)" at head} corresponding to the inputted character "あ(a)" are in existence is decided. If the corresponding registrations exist, the system enters from the step S27 to step S28. At the step S28, the corresponding registrations are fetched, and the fetched registrations are stored in order of candidates into the buffer memory BM. After that, the system enters from the step S28 to a step S29. If a corresponding registration does not exist in the user registration dictionary 8, the system directly enters from the step S27 to the step S29.

At the step S29, whether or not one or more conversion candidates exist in the basic dictionary 9 is decided. That is, in the basic dictionary 9, whether or not one or more registrations {or one or more character strings (Hiragana sentence, Kana-Kanji mixture sentence) with the inputted character "あ(a)" at head} corresponding to the inputted character "あ(a)" is in existence is decided. If the corresponding registrations exist, the system enters from the step S29 to a step S30. At the step S30, the corresponding registrations are fetched in order of candidates, and the fetched registrations are stored into the buffer memory BM. After that, the system enters from the step S30 to a step S31. If a corresponding registration does not exist in the basic dictionary 9, the system directly enters from the step S29 to the step S31.

At the step 31, a display region part of a conversion candidate is taken out from the head of the buffer memory BM. In this case, a conversion candidate overlapping with another candidate is excluded.

At a step 32, in regard to one or more conversion candidates which are stored in priority order from head in the buffer memory BM at the steps S24, S26, S28 and S30, a conversion candidate or a conversion result, which is taken out only the display region part from the head of the conversion candidate at the step S31, is displayed as a display character string shown in FIG. 6, for example.

By this, when the conversion key 16 is pressed after inputting "あ(a)" as one character, one or more conversion candidates having "あ(a)" at its head are displayed in order starting from a time band corresponding to the present time of the input to the history dictionary 6 and the time dictionary 7, and in priority order of the user registration dictionary 8 and the basic dictionary 9, as shown in FIG. 6 as an example (in this case, the time of input of "あ(a)" is 17:00). Because of this, since a conversion candidate having a time band corresponding to the time of the present input is displayed as a supreme conversion candidate 20, an optimum conversion candidate can be obtained and conversion efficiency can be improved further.

In this embodiment, the time band corresponded to the inputted character 18 is registered only in the time dictionary 7, and, when the time dictionary 7 is retrieved, one or more conversion candidates are displayed in priority order starting from the time band corresponding to the time of the present input. In the same way in respect to the history dictionary 6, a time band corresponding to a time point of use (the time point used and selected by pressing the decision key 17) is registered so as to correspond to a character in a head of a used character string, and, when the history dictionary is retrieved, a conversion candidate or a conversion result may be displayed in priority order starting from the time band corresponding to the time of the present input.

An example of display of conversion candidates is explained by referring to FIG. 6 as an example. FIG. 6 is a drawing showing a relation between a display character string and a use dictionary. In FIG. 6, the display character string shown in a left side represents conversion candidates, and the use dictionary shown in a right side represents a dictionary used for retrieval and fetch of the display character string {the history dictionary 6, the time band (morning, noon, night and midnight) of the time dictionary 7, the user registration dictionary 8 and the basic dictionary 9}. In addition, the time dictionary 7 fetches in priority order starting from a time band corresponding to the time of the input, and displays in the direction from upward to downward as shown in FIG. 6 and the following. The time dictionary 7 rotates starting from a time band corresponding to the time of the input. The conversion candidates namely the display character string shown in the left side represent from a supreme conversion candidate to a subordinate conversion candidate in the direction from upward to down ward. Here, in respect to the inputted character "あ(a)", its conversion candidates are as follows.

| Display Character String | Use Dictionary | |
|---|---|---|
| 雨が | (amega) (the rain) | the history dictionary 6: used immediately before |
| 朝は | (asawa) (in the morning) | the history dictionary 6: used immediately before |
| 朝日 | (asahi) (the morning sun) | the time dictionary 7: night (assuming that the time of the input of "あ (a)" is 17:00) |
| 遊ぶ | (asobu) (play) | the time dictionary 7: night (assuming that the time of the input of "あ (a)" is 17:00) |
| 朝帰り | (asagaeri) (come home eary morning) | the time dictionary 7: midnight (assuming that the time of the input of "あ (a)" is 17:00) |
| 会いたい | (aitai) (want to see) | the time dictionary 7: morning (assuming that the time of the input of "あ (a)" is 17:00) |
| 朝寝坊 | (asanebou) (a late riser) | the time dictionary 7: morning (assuming that the time of the input of "あ (a)" is 17:00) |
| 朝ごはん | (asagohan) (breakfast) | the time dictionary 7: morning (assuming that the time of the input of "あ (a)" is 17:00) |
| 暖かい | (atatakai) (warm) | the time dictionary 7: noon (assuming that the time of the input of "あ (a)" is 17:00) |
| 後でね | (atodene) (see later) | the time dictionary 7: noon (assuming that the time of the input of "あ (a)" is 17:00) |
| 愛鷹 | (ashitaka) | the user registration dictionary 8 |
| 亜 | (a) | the basic dictionary 9 |
| 阿 | (a) | " |
| ア | (a) | " |
| あ | (a) | " |
| ... | | |

Like this, the conversion candidates are fetched in order of the history dictionary 6, the time band (order from a starting point of morning, noon, night or midnight) of the time dictionary 7, the user registration dictionary 8 and the basic dictionary 9, and are displayed like the inputted character strings shown in the drawing. Since the conversion candidates are displayed in order in accordance with the time band corresponding to the time of the present input, selection of conversion candidates can become easy and the conversion efficiency can be improved further.

In this embodiment, the history dictionary 6, for example, is constituted as shown in FIG. 7. FIG. 7 shows contents of registration in the history dictionary 6. This history dictionary 6 sets character strings (Kana-Kanji mixture sentence) as conversion results. The character strings (Kana-Kanji mixture sentence) are displayed in the input field 14 and are inputted by pressing the decision key 17 in the past. The history dictionary 6 corresponds to a character (ex. "あ(a)") of its head of the conversion result and registers these, and registers the newest conversion result in head. As mentioned before, the history dictionary 6 may corresponds to the inputted character 18 shown in the drawings and registers the time information (ex. a time band) together with the conversion candidates. According to this, corresponding conversion candidates can be fetched in order stating from a time band corresponding to the time of the input of the inputted character 18 namely the conversion object. For example, if the time of the input is 8:00 AM, the corresponding conversion candidates are fetched in order of morning, noon, night and midnight.

Therefore, according to the history dictionary 6 mentioned above, a conversion candidate and a conversion result used immediately before can be preferentially displayed. Furthermore, in the case that the time information representative of a time band is registered, conversion candidates and conversion results can be displayed in order of a time band with the time information of a time band corresponding to the time of the input as a momentum.

Further, in this embodiment, the time dictionary 7 is constituted as shown in FIG. 8(*a*). In the time dictionary 7, conversion candidates corresponding to the inputted character 18 are registered, and each time band as the time information corresponding to a conversion candidate is registered. Each time band, for example, has a state shown in FIG. 8(*b*). Each time band is set based on the meaning of a character string and a use of a conversion candidate, a temporal relation between a conversion candidate and time, and so on. In addition, a time band registered to a conversion candidate can be set freely by a user. In this embodiment, each time band is registered as follows as one example.

| Input Character | Conversion Candidate | | Time Band |
|---|---|---|---|
| あ(a) | 明日 | (ashita) (tomorrow) | night |
| あ(a) | 遊ぶ | (asobu) (play) | night |
| あ(a) | 朝帰り | (asagaeri) (come home early morning) | midnight |
| あ(a) | 朝寝坊 | (asanebou) (a late riser) | morning |
| あ(a) | 後でね | (atodene) (see later) | noon |
| ... | | | |

Each time band represents a fixed time scope. In this embodiment, for example, each time band is defined as shown in FIG. 8(*b*). That is, a relation between each time band and time is as follows.

| Time Band | Time |
|---|---|
| Morning | 5:00–10:59 |
| Noon | 11:00–16:59 |
| Night | 17:00–22:59 |
| Midnight | 23:00–4:59 |

Like this, in the time dictionary 7, a conversion candidate and a time band are corresponded to the inputted character 18 and are registered. Conversion candidates are read-out in response to a time band including the time of the input of the inputted character 18 together with the inputted character 18 as the conversion object, and these conversion candidates are displayed in order starting from a corresponding time band. As a result of this, in respect to a plurality of conversion candidates common to the inputted character 18, a conversion candidate or a conversion result corresponding to time is obtained since the time information is used as a clue. By this, the optimum conversion processing can be obtained and the conversion efficiency can be improved.

In this embodiment, the user registration dictionary 8 is constituted as shown in FIG. 9 as an example. The user registration dictionary 8 is a dictionary in which a user can register the inputted character 18 as the conversion object and one or more conversion candidates. The user registration dictionary 8 can register a desired conversion candidate or a desired conversion result corresponding to the inputted character 18 with the same form as other dictionaries. An example of registration is as follows.

| Input Character | Reading | Conversion Candidate |
| --- | --- | --- |
| あ (a) | あしたか (ashitaka) | 愛鷹 (ashitaka) |

Since the user registration dictionary 8 mentioned above is provided, a user can register a peculiar character string including a place name and a person's name with frequent use, in association with the inputted character 18. By using this user registration dictionary 8, a conversion candidate and a conversion result corresponding to the inputted character 18 can be quickly and easily displayed, and the conversion efficiency can be improved.

In this embodiment, the basic dictionary 9 is constituted as shown in FIG. 10 as an example. The history dictionary 6, the time dictionary 7 and the user registration dictionary 8 are application dictionaries which increase contents of registration by user using. As compared with these dictionaries, the basic dictionary 9 is a fundamental dictionary which registers a fundamental letter and symbol used by the above dictionaries. Specifically, the basic dictionary 9 stores a letter, a symbol, an element of letter or symbol and a combination not less than two of these, as the conversion object, and one or more conversion candidates. In respect to registration form of these, a conversion candidate or a conversion result are corresponded to an inputted character namely the conversion object and are registered.

Figure 11:
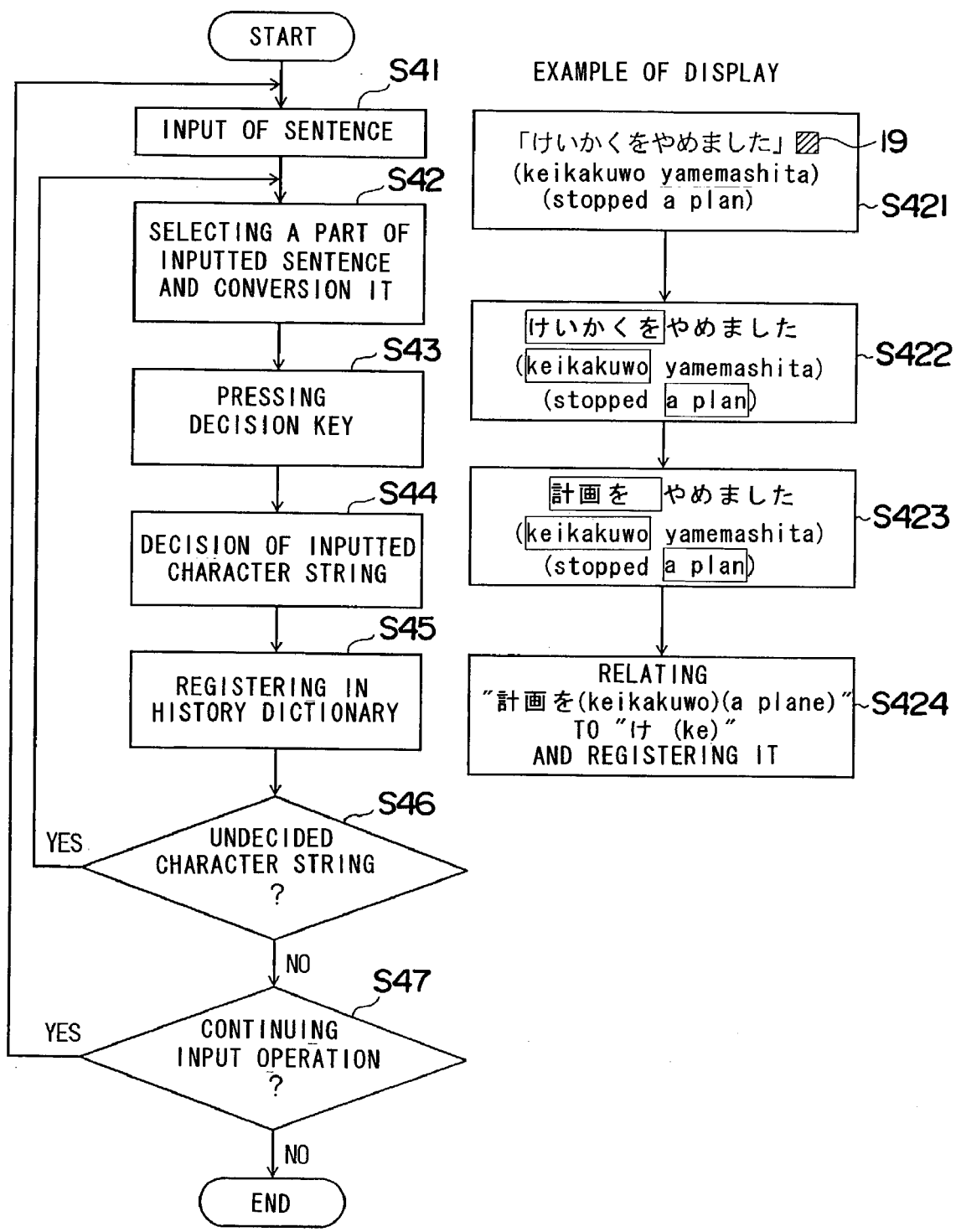
FIG. 11 is a flow diagram showing dictionary registration processing and an example of display.

Therefore, in respect to the information processing of this embodiment, dictionary registration processing is explained by referring to a flow diagram and an example of display of FIG. 11. FIG. 11 is the flow diagram showing the dictionary registration processing and the example of display. In FIG. 11, the example of display is the display in the input field 14 of the display unit 10, and shows shift of the display by an input operation.

In this processing, the dictionary registration processing can perform parallel to sentence input processing. Therefore, after starting, at a step S41, a desired sentence is inputted. In this input of the sentence, the sentence is inputted in the input field 14 of the display unit 10 by a user operating the character keys 15 of the input unit 11. For example, a sentence shown in a right side of the flow diagram is inputted. In this case, the inputted sentence namely the conversion object is as follows, as shown in a step S421.

"けいかくをやめました(keikakuwo yamemashita) (stopped a plan)"

At a step S42, a part of the inputted sentence is selected and is converted. As shown in a step S422 as an example, the display of "けい かくを(keikakuwo) (a plan)" is selected. If the conversion key 16 is pressed, as shown in a step S423, "けい かくを(keikakuwo) (a plan)" under a state of selection is converted into "計画 を(keikakuwo) (a plan)", and its conversion result is displayed as follows.

"計画 をやめました(keikakuwo yamemashita) (stopped a plan)"

At a step S43, the conversion result is decided. That is, if the decision key 17 is pressed at the step S42 under the state that the part of the sentence has been converted, the system enters from the step S43 to a step S44, and the inputted sentence together with its conversion result are decided. That is, by pressing the decision key 17 at the step 43, "計画 を(keikakuwo) (a plan)" is decided.

At a step S45, "計画 を(keikakuwo) (a plan)" is registered into the history dictionary 6. That is, as shown in a step S424, "計画 を(keikakuwo) (a plan)" decided at the step S44 is corresponded to one character "け (ke)" at the head of the sentence and is registered in the history dictionary 6.

At a step S46, whether or not an undecided character string is in existence is decided. If an undecided character string is in existence, the system returns from the step S46 to the step S42, and the processing of the steps S42–S45 is repeated. If an undecided character string is not in existence, the system enters from the step S46 to a step 47.

At the step S47, whether or not the input of a character is continued is decided. If the input of a character is continued, the system returns from the step S47 to the step S41, and the processing is repeated. If the input of a character is not continued, the processing is terminated. In this case, whether or not the input of a character is continued can be decided based on an another operation of the decision key 17, for example.

Like this, a character string (ex. "計画 を(keikakuwo) (a plan)") decided by pressing the decision key 17 is corresponded to one character "け (ke)" at a head of a character string and can be stored in the history dictionary 6. In addition, as mentioned above, in the history dictionary 6, if the time information representative of a time band corresponding to time of a press of the decision key 17 is registered, conversion candidates can be read-out from the history dictionary 6 in order starting from a time band including the time of the input and can be displayed in that order, when the conversion key 16 is pressed after inputting one character to the input field 14.

In the first embodiment, as explained by referring to FIG. 1—FIG. 11, a character is inputted by operating the character keys 15, and its inputted character 18 is displayed in the input field 14 namely the input or display region. Under the state of this, when the conversion key 16 is pressed, display character strings (ex. character strings shown in FIG. 6) are displayed in the display region 14 of the display unit 10, as shown in FIG. 12(*a*). If the decision key 17 is pressed after selecting one of character strings, a displayed character string to decide is selected, its character string is decided and the input to the input field 14 is enable. At this time, since a conversion candidate is displayed in order starting from a time band including the time of its input, an optimum conversion candidate for the time band can be obtained. Therefore, the conversion efficiency can be improved, and it is possible to quickly convert in the input processing.

Figures 12A, 12B:
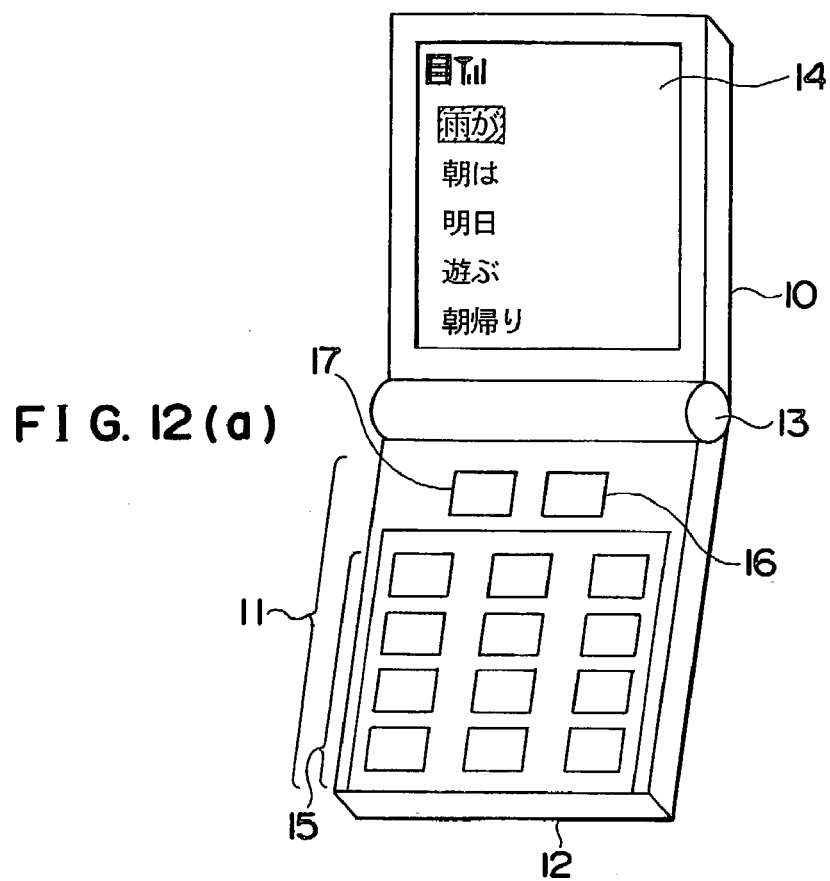
FIG. 12(*a*) is a perspective view showing a mobile telephone as an information processing device representative of the first embodiment according to the present invention.

In this embodiment, although this embodiment is explained by using the mobile telephone, the processing system shown in FIG. 1 can be applied to a PDA (Personal Digital Assistants) as shown in FIG. 12(*b*) as an example. In the PDA, components which are given the same reference numerals as those of the mobile telephone shown in FIG. 12(a) indicate a common part. In the input field 14 namely the display region provided at an upper portion of a PDA body 22, the display character strings shown in FIG. 6 are displayed. In a lower portion of the input field 14, the input unit 11 is provided likewise the mobile telephone. This input unit 11 includes a plurality of character input regions 24, 26 and 28 (these display a handwriting character region or software keys) as an information input part corresponding to the character keys 15 of the mobile telephone, and a conversion key 16 and a decision key 17 adjacent to the character input regions 24–28.

In the PDA, as explained previously by referring to FIG. 1-FIG. 11, a character is inputted in the character input regions 24–28, and its inputted character is displayed on the input field 14. Under the state of this, when the conversion key 16 is pressed, the inputted character is converted into a display character string (ex. character strings shown in FIG. 6), and one or more display character strings are displayed. Therefore, if the decision key 17 is pressed after selecting one of the display character strings, a selected display character string is decided on the inputted field 14, and the input of the display character string is enabled. In this case, since conversion candidates are displayed in order starting from a time band including the time of its input, the conversion efficiency from the conversion object to conversion candidates or conversion results can be improved, and the quick conversion processing and the quick input processing can be realized.

As described in detail, the conversion part 3 includes the order changing part which changes order of the conversion candidates by using the time information at the time of the conversion of the conversion object. By this, in a change of the order of conversion candidates, it is possible to give priority order to a conversion candidate based on the time information. That is, a daily greeting is different at a time band. If a time band is morning, "おはよう (ohayou) (good morning)" is used. If a time band is evening, "おつかれ (otsukare) (good work today)" is used. If a time band is night, "おや すみ (oyasumi) (good night)" is used. Therefore, as one example, the conversion object is set to "お (o)" and its conversion candidate is set to "おつかれ (otsukare) (good work today)", "おはよう (ohayou) (good morning)" and "おや すみ (oyasumi) (good night)". By these conversion candidates being related to the time information, "おはよう (ohayou) (good morning)" is set to the first priority candidate when the time information represents morning, "おつかれ(otsukare) (good work today)" is set to the first priority candidate when the time information represents evening, and "おや すみ (oyasumi) (good night)" is set to the first priority candidate when the time information represents night. By this, it is possible to change a conversion candidate based on the time information. According to this conversion processing, as compared with a predictive conversion which refers to only an input history, the gap between the time of the conversion and a character string namely a greeting does not occur. Therefore, a conversion result can be optimized, and the conversion efficiency can be improved. In other words, it is possible to change the order of conversion candidates and conversion results in accordance with the time information of the time of the conversion. Because of this, the conversion processing to a conversion candidate or a conversion result can be easily and quickly performed, and an optimum conversion result which a user expects can be obtained. The above conversion processing can be performed irrespective of a kind of language.

(Second Embodiment)

Figure 13:
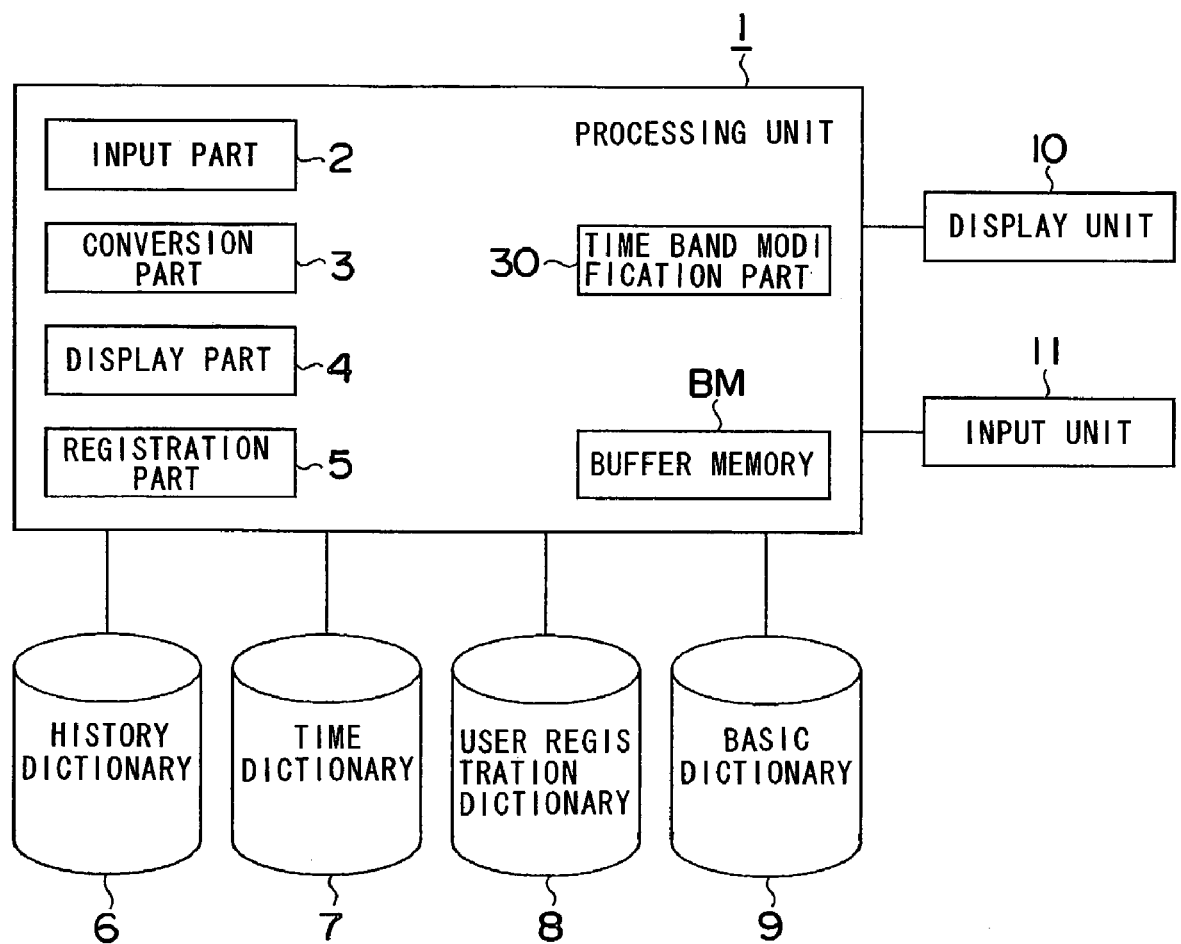
FIG. 13 is a block diagram showing a processing system representative of a second embodiment of an information processing device, an information processing method, an information processing program and a program product containing the information processing program according to the present invention.

Next, FIG. 13 shows a processing system as a second embodiment of an information processing device, an information processing method, an information processing program and a program product containing the information processing program according to the present invention. This processing system has a time band modification part 30 as a time modification part modifying the relation between a conversion candidate and the time information in the processing unit 1. That is, the time band modification part 30 modifies the relation between the time information and a conversion candidate or a conversion result based on a conversion candidate or a conversion result selected at the time of the conversion of the conversion object.

According to a constitution like this, it is possible to perform quick and optimum conversion processing corresponding a time band of life of a user. That is, since a time band of life differs from individual to individual, a form of a greeting is changed in accordance with a time band of life, for example. If the conversion corresponding to a time band of life can be obtained, serviceableness will be improved. For example, "good morning" is used in the night, and "good night" is used in the morning. Therefore, in this processing system, a relation between the time information and a conversion candidate is modified in accordance to a time band of life decided from a conversion candidate selected at the time of the conversion. By this, a priority candidate corresponding to a time band of life can be taken out, and an optimum conversion result corresponding to expectance of a user can be obtained. According to this processing, the gap between the time of the conversion and a conversion candidate namely a character string of a greeting corresponding to a time band of life of a user does not occur. Therefore, a conversion candidate can be optimized, and the conversion efficiency can be improved. In addition, the quick conversion processing and the improvement of serviceableness will be obtained.

(Third Embodiment)

Figure 14:
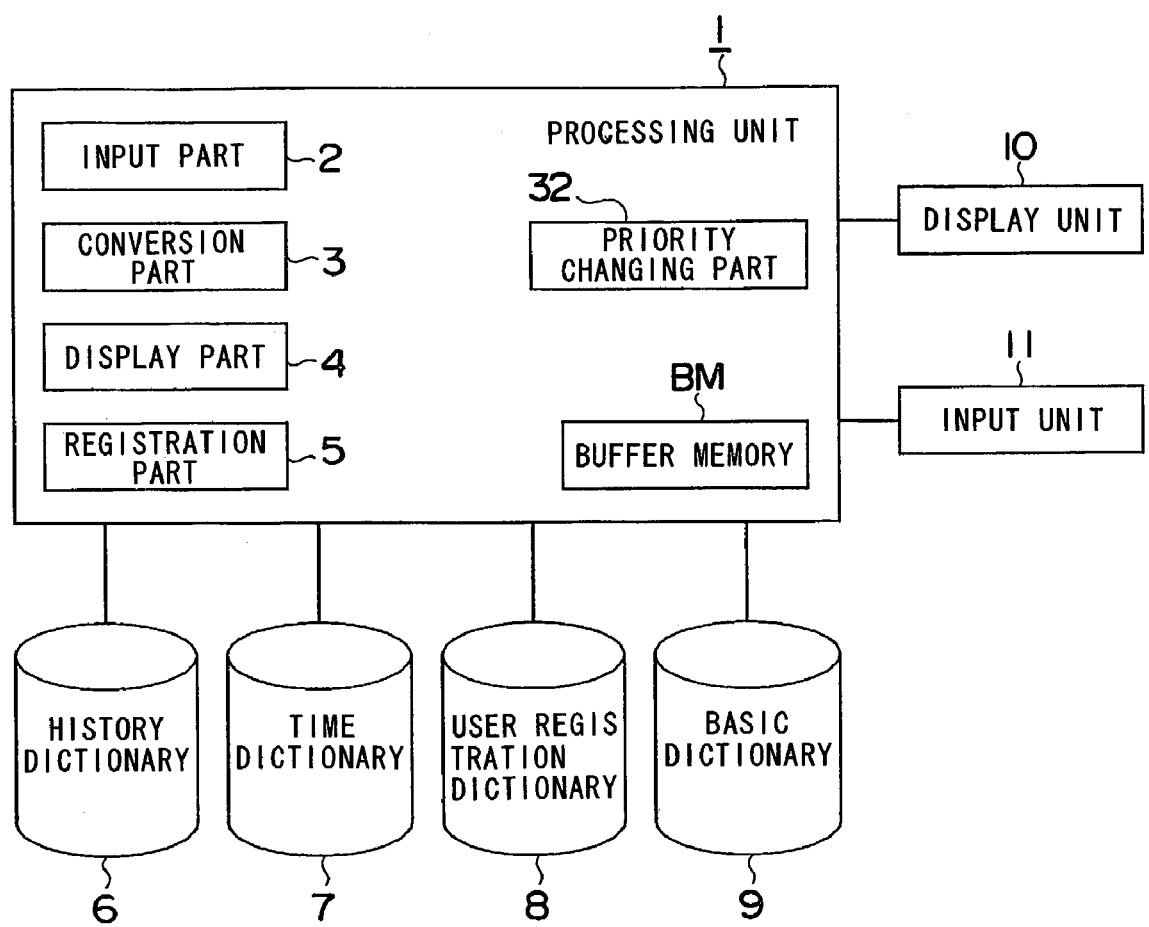
FIG. 14 is a block diagram showing a processing system representative of a third embodiment of an information processing device, an information processing method, an information processing program and a program product containing the information processing program according to the present invention.

Next, FIG. 14 shows a processing system as a third embodiment of an information processing device, an information processing method, an information processing program and a program product containing the information processing program according to the present invention. This processing system includes a priority changing part 32 in the processing unit 1. The priority changing part 32 can change the priority of read-out order of the history dictionary 6, the time dictionary 7, the user registration dictionary 8 and the basic dictionary 9, when obtaining a conversion candidate or conversion result from the conversion object. In the first embodiment, a conversion candidate is fetched from the history dictionary 6 in the first, the time dictionary 7 in the second, the user registration dictionary 8 in the third and the basic dictionary 9 in the fourth. In this embodiment, by using the priority changing part 32, the priority order of the dictionaries can be optionally set by an operation of the input unit 11. For example, in this embodiment, it is possible to adopt the priority order of the dictionaries of the first embodiment. It is also possible to set the time dictionary 7 to the first, the history dictionary 6 to the second, the user registration dictionary 8 to the third and the basic dictionary 9 to the fourth. It is also possible to set the user registration dictionary 8 to the first, the time dictionary 7 to the second, the history dictionary 6 to the third and the basic dictionary 9 to the fourth. Like this, since the priority order of conversion candidates or conversion results is changed by the read-out order of the dictionaries, the conversion corresponding to a manner of use of a user can be obtain, and the quick and optimum conversion processing can be obtained. The improvement of serviceableness and the conversion efficiency can be also obtained.

(Fourth Embodiment)

Figure 15:
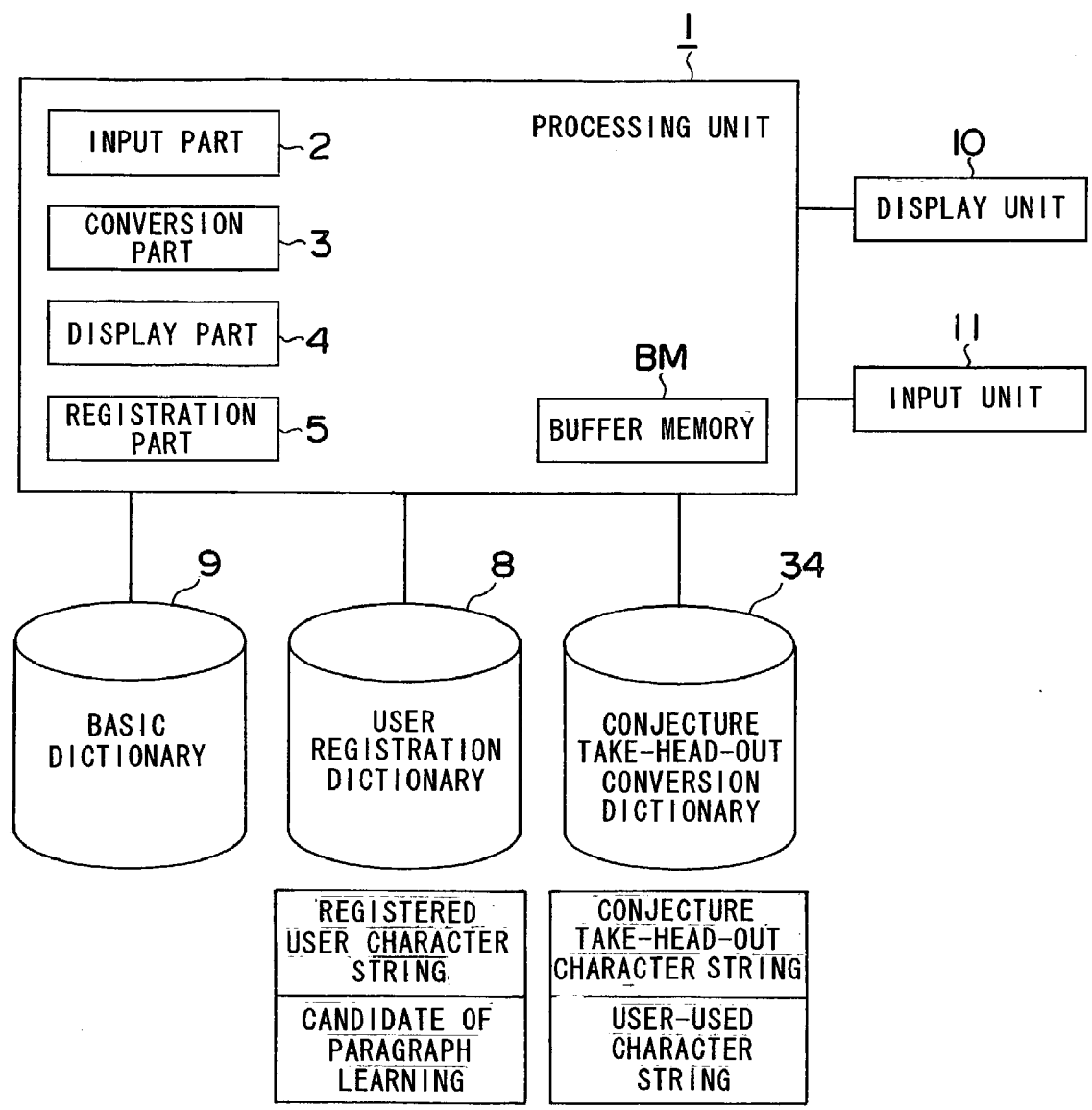
FIG. 15 is a block diagram showing a processing system representative of a fourth embodiment of an information processing device, an information processing method, an information processing program and a program product containing the information processing program according to the present invention.

Next, FIG. 15 shows a processing system as a fourth embodiment of an information processing device, an information processing method, an information processing program and a program product containing the information processing program according to the present invention. This processing system has the basic dictionary 9, the user registration dictionary 8, and a conjecture take-head-out conversion dictionary 34 (hereinafter referred to as "conjecture conversion dictionary") as a database storing conversion candidates or conversion results. The conjecture conversion dictionary 34 corresponds to the history dictionary 6 and the time dictionary 7 in the processing system shown in FIG. 1, and makes contents of registration develop further. The user registration dictionary 8 and the conjecture conversion dictionary 34 are a dictionary of the same form, and are a database in which a desired conversion candidate and conversion result are registered by a user. The user registration dictionary 8 stores a registered user character and character string, and a candidate of a paragraph learning. The conjecture conversion dictionary 34 stores a conjecture take-head-out character and character string, and a user-used character and character string. In conversion form, the user registration dictionary 8 is a paragraph conversion, and the conjecture conversion dictionary 34 makes a letter, a symbol and an element of a letter or a symbol as a conversion object. In addition, as the conversion object of the conjecture conversion dictionary 34, instead of a letter, a symbol and an element of a letter or a symbol, a combination not less than two of these may be used. When the number of registered characters increases, a registration area of the basic dictionary 9 may be utilized.

In the user registration dictionary 8, the basic dictionary 9 and the conjecture conversion dictionary 34, priority between letters with the same pronunciation in the conversion object is order of the conjecture conversion dictionary 34 (the first), the user registration dictionary 8 (the second) and the basic dictionary 9 (the third). When having the same priority, it is order of registrations. The order of the registrations becomes order of read-out, and this makes a contribution to a quick and optimum conversion.

In the conjecture conversion dictionary 34, as shown in a table 1 as an example, the first though the fourth fields are set. Each of the fields is assigned to an item number, an index (reading), contents and time, and a candidate is registered in these. At this, the (reading) is a reading of the index in the Japanese language, for example. The time is the time information representative of a time band.

TABLE 1

| First field | Second field | Third field | Fourth field |
|---|---|---|---|
| Item number | Index (reading) | Contents (Kanji) | Time |

The item number, the reading and the number of readings in the table 1 are shown like a table 2 as an example. In this table 2, the number of readings for the conjecture take-head-out conversion signifies that, in an example of an inputted character "あ (a)", an initial registered character or character string conjectured by the inputted character "あ (a)" and by an operation of the conversion key 16 (FIG. 2) is in existence, and that, in an example of an inputted character "ん(n)", an initial registered character or character string conjectured by the inputted character "ん (n)" and by an operation of the conversion key 16 (FIG. 2) is not in existence.

TABLE 2

| Item number | Index(reading) | Number of readings |
|---|---|---|
| 1 | あ(a)~お(o) | 5 |
| 2 | か(ka)~こ(ko) | 5 |
| 3 | さ(sa)~そ(so) | 5 |
| 4 | た(ta)~と(to) | 5 |
| 5 | な(na)~の(no) | 5 |
| 6 | は(ha)~ほ(ho) | 5 |
| 7 | ま(ma)~も(mo) | 5 |
| 8 | や(ya)ゆ(yu)よ(yo) | 3 |
| 9 | ら(ra)~ろ(ro) | 5 |
| 10 | わ(wa) | 1 |
| 11 | が(ga)~ご(go) | 5 |
| 12 | ざ(za)~ぞ(zo) | 5 |
| 13 | だ(da)~で(de)ど(do) | 3 |
| 14 | ば(ba)~ぼ(bo) | 5 |
| 15 | ぱ(pa)~ぽ(po) | 5 |
| Total | | 67 |

At this, assuming that the number of initial registrations for one reading is "2" and the number of readings as an object of the conjecture take-head-out conversion is "67" from the table 2, since time bands of a day are four "4" parts, the number "n" of registrations in respect to a conjecture take-head-out conversion is as follows, as an example.

n=4×67×2=536

In this embodiment, if a common index (reading) for reading-out a conversion candidate or a conversion result registered in the user registration dictionary 8 and the conjecture conversion dictionary 34 is given to the conversion dictionaries 8 and 34, it is possible to read-out simultaneously from both of them. However, by having a different index (reading) each other, contents read-out from these can be distinguished. In this case, in respect to the longest index (reading), if the user registration dictionary 8 is set to some characters of about 8–15 characters as an example, and if the conjecture conversion dictionary 34 is set to one character as an example, priority of read-out of the dictionaries 8 and 34 can be set by the index (reading). In addition, in an automatic registration, for example, if the automatic registration is set at time of expansion of a paragraph or at time of reduction of a paragraph in the user registration dictionary 8, and if the automatic registration is set only at time of decision of a paragraph in the conjecture conversion dictionary 34, it is possible to select a dictionary of the automatic registration based on distinction between the time of the expansion of a paragraph or the time of the reduction of a paragraph and the time of the decision of a paragraph. At this, a term "paragraph" is the smallest part with signification in a sentence as apparent from the following description, and signifies "bunsetsu (文節)" in the Japanese language. In addition, in respect to the greatest number of registered characters, if the user registration dictionary 8 is set on a small scale of about 100 characters, and if the conjecture conversion dictionary 34 is set on a large scale of 536 or more characters, a degree of freedom of the conjecture conversion can be raised.

Next, a take-head-out conversion and the conjecture take-head-out conversion are explained. In the mobile telephone as an example of the processing system, since input of a character is performed by numeric keys, an input operation increases in accordance with the number of characters. Since operations of conversion and decision are further necessary, the number of key operations increases acceleratedly in accordance with increment of input information. In this embodiment, a key operation can be reduced by using the take-head-out conversion and the conjecture take-head-out conversion.

In the take-head-out conversion, a character string used by a user is automatically registered, this registered character string is set as a conversion candidate or a conversion result, and a reading of a character in the head of the registered character string is set as a conversion object. Then, by using the reading of the character in the head, a conversion candidate or a conversion result is preferentially fetched from dictionaries including the basic dictionary 9 and the conjecture conversion dictionary 34. Specifically, a character string used by a user, namely inputted and decided by the input unit 11, is automatically registered in the user registration dictionary 8. Then, by input of a reading of a character in the head of the registered user character string and by a press of the conversion key 16, the registered user character string as a conversion candidate or a conversion result is outputted from the conjecture conversion dictionary 34 in preference to the basic dictionary 9.

The conjecture take-head-out conversion uses the take-head-out conversion together with the time information, and thereby expands a function. The take-head-out conversion corresponds to necessity of a user. However, in the case of only the take-head-out conversion, sometimes key operations are not reduced. The conjecture take-head-out conversion can expands serviceableness further. About 500 characters as candidates for the take-head-out conversion are stored in the conjecture conversion dictionary 34 with the same form as the user registration dictionary 8 in advance. Based on input of the character keys 15, priority is decided by referring to a time band including the time of the input, and a registered character string is outputted. By referring to a time information like this, taking out a conversion candidate in respect to a conversion object is optimized and is quickly performed. That is, the conjecture take-head-out conversion promotes a function of the take-head-out conversion.

In this conjecture take-head-out conversion, it is assumed that a user has been inputted a character string "朝は/雨が/降っていました(ashawa/amega/futteimashita) (the rain fell in the morning)", and has decided after that. The above character string has three paragraph which are "朝は (in the morning)", "雨が (the rain)" and "降っていました(fell)". In this case, in respect to characters which have been used by the user, an automatic learning is performed as follows. At this, the automatic learning is to register automatically the character string in the user registration dictionary 8. In this case, as shown in a table 3 as an example, an index (reading) showing a conversion object and contents of registration (Kant) are registered in the user registration dictionary 8. A registration is performed in order of decision, that is, a character string is stored in order of a registration.

TABLE 3

| Order of registration | Index (reading) of registration | Contents (Kanji) of registration |
|---|---|---|
| 1 | あ (a) | 朝は (asawa)(morning) |
| 2 | あ (a) | 雨が (amega)(rain) |
| 3 | ふ (fu) | 降っていました (futteimashita)(it rained) |

Figure 16:
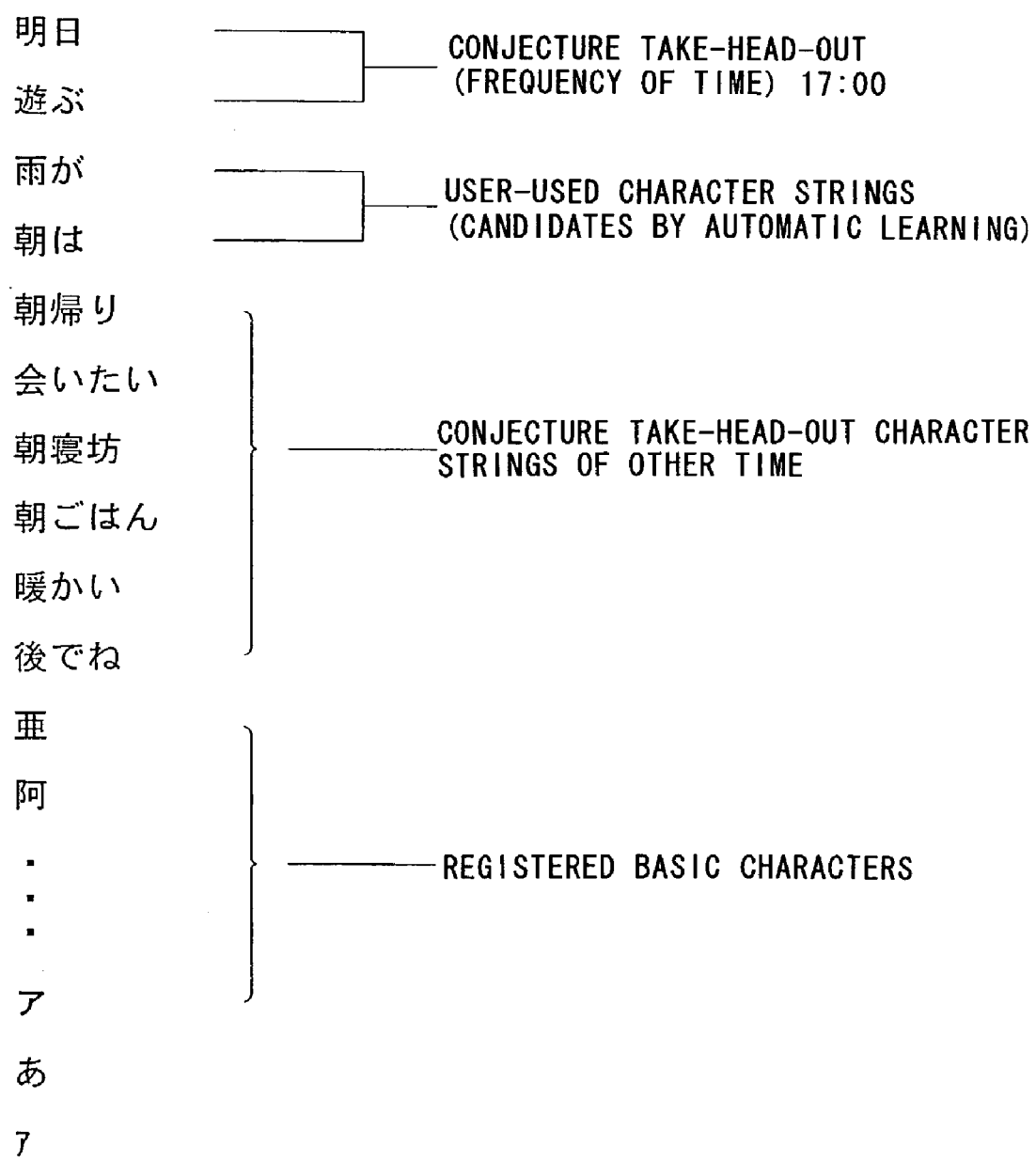
FIG. 16 is a drawing showing a relation between a display character string and a use dictionary.

Under this state, it is assumed that the user inputs "あ (a)" as reading of one character by the input unit 11, and the time of this input is evening. When the conversion key 16 is pressed, as shown in FIG. 16, conversion candidates or results for the conversion object "あ (a)" are displayed on the display region 14 of the display unit 10. In FIG. 16, a conjecture take-head-out character string is fetched from the conjecture conversion dictionary 34, a registered user character string is fetched from the user registration dictionary 8, a conjecture take-head-out character string of other time is fetched from the conjecture conversion dictionary 34, and a basic character is fetched from the basic dictionary 9. Since the time of the input is evening, a character string having a higher frequency of time is fetched. That is, the character st rings "明日 (ashita) (tomorrow)" and "遊ぶ (asobu) (play)" are included in the time band of evening, and therefor these character strings have a higher priority.

The conversion processing is explained specifically by referring to an example 1, an example 2 and an example 3.

EXAMPLE 1

The example 1 is the conjecture take-head-out conversion processing (the time of the input is 8:00 AM)

Figure 17:
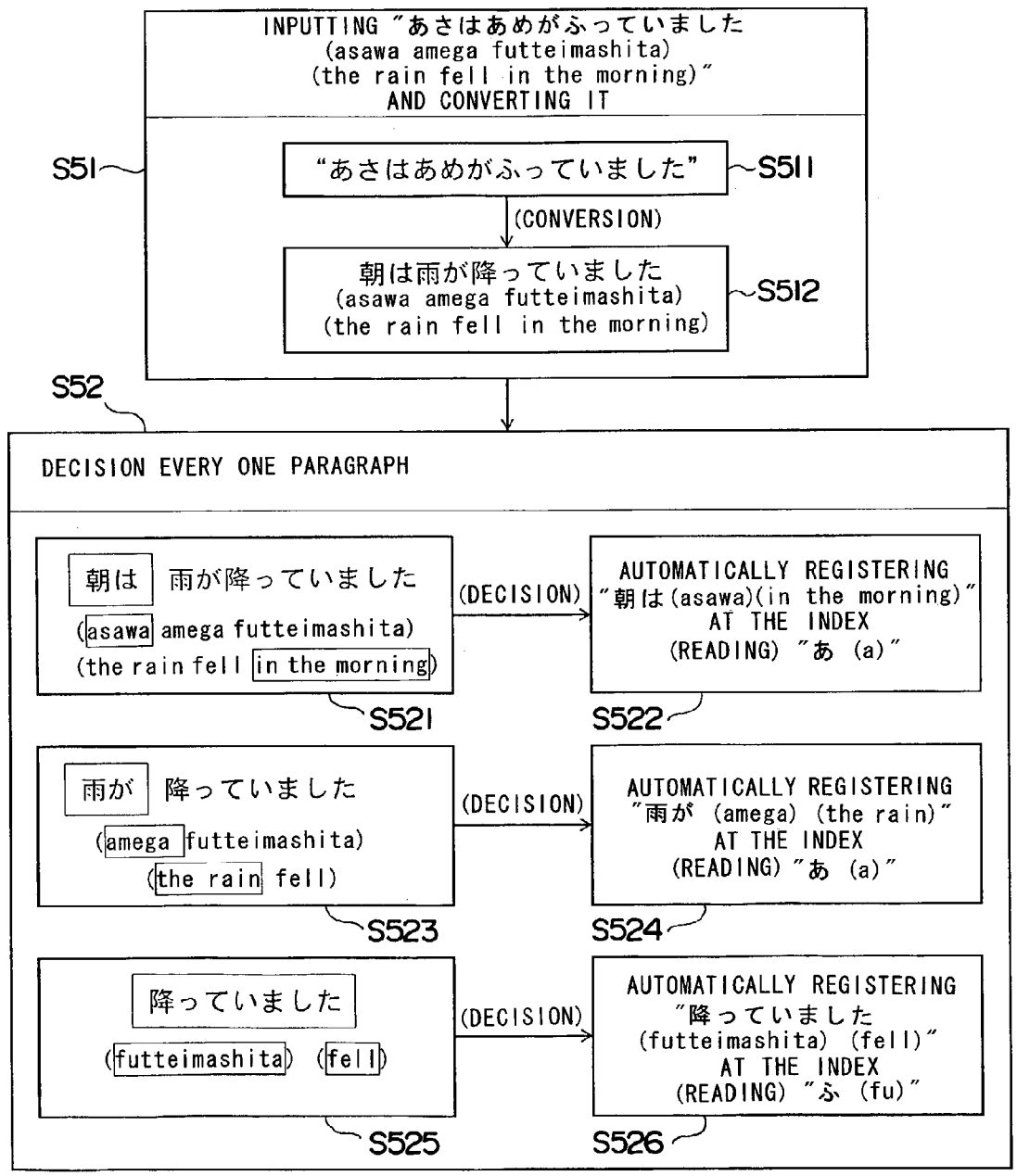
FIG. 17 is a flow diagram showing conjecture take-head-out conversion processing.
Figure 18:
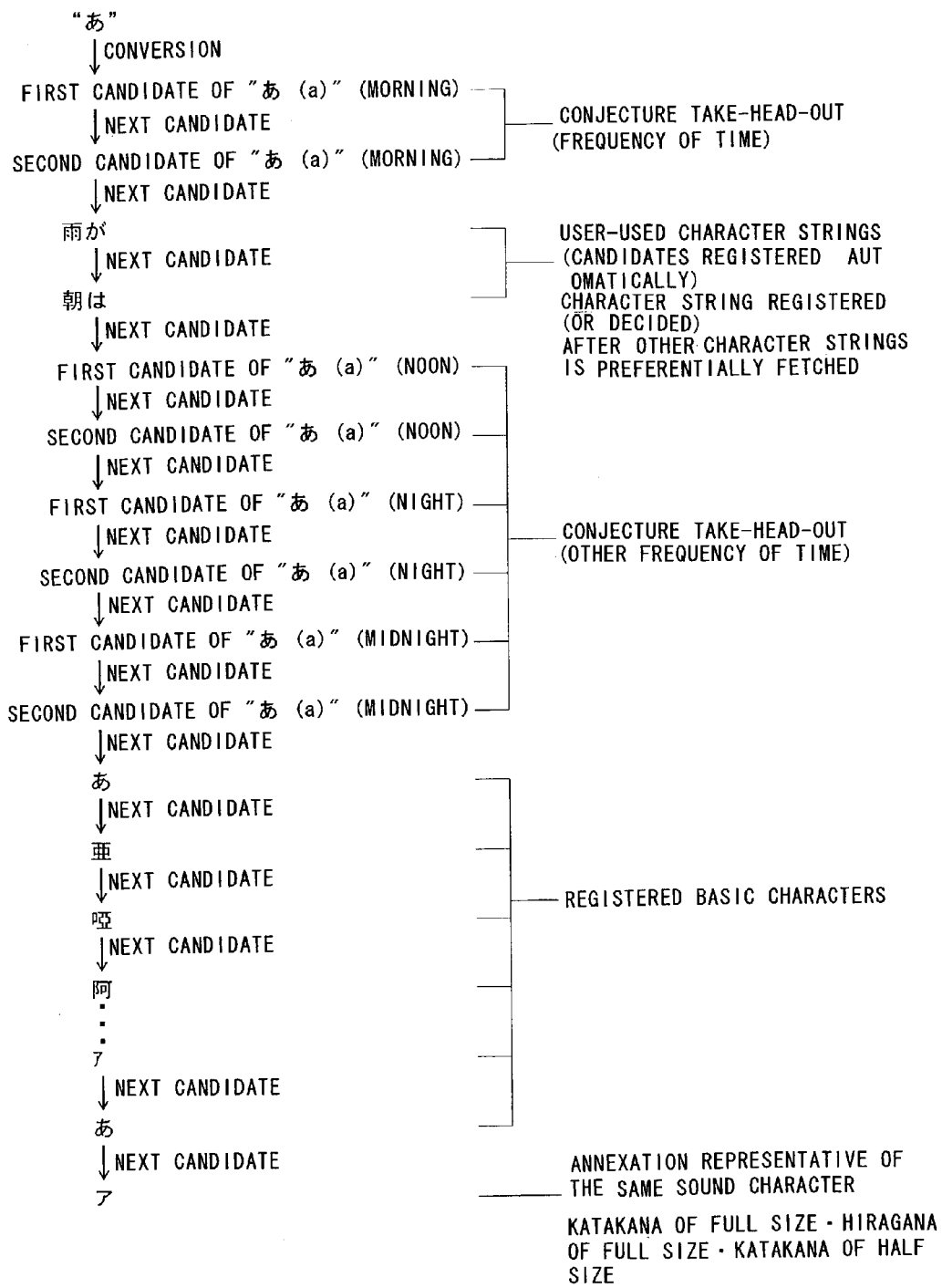
FIG. 18 is a drawing showing conversion processing in relation to input of a single character.

In this processing, as shown in FIG. 17 as an example, input and conversion processing is performed at a step S51, and decision processing is performed at a step S52. That is, at a step S511, a character string "あさはあめがふっていました (asawa amega futteimashita) (the rain fell in the morning)" is inputted, and this character string is converted into "朝 は雨が降っていました(asawa amega futteimashita) (the rain fell in the morning)" by a character conversion at a following step S512. In this case, "朝 (asa) (morning)", "雨 (ame) (rain)" and "降って (futte) (fell)" are converted from Hiragana to Kant.

At the step S52, the decision processing is performed every one paragraph of the character string "朝 は雨が降っていました(asawa amega futteimashita) (the rain fell in the morning)". That is, at steps S521 and S522, a first paragraph "朝 は(asawa) (in the morning)" is automatically registered in the conjecture conversion dictionary 34 in association with "あ (a)" of the index (head, reading). At steps S523 and S524, a second paragraph "雨 が(amega) (the rain)" is automatically registered in the conjecture conversion dictionary 34 in association with "あ (a)" of the index. At steps S525 and S526, a third paragraph "降って ていました(futteimashita) (fell)" is automatically registered in the conjecture conversion dictionary 34 in association with "ふ (fu)" of the index.

After the above registration processing, when the conversion key 16 is pressed after input of one character "あ (a)", candidates having a higher frequency of time are fetched by referring to the time information. After that, the newest registered user-used character strings "雨 が(amega) (the rain)" and "朝 は(ashawa) (in the morning)" are fetched as next candidates. That is, a conjecture take-head-out candidate having a higher frequency of time is fetched in preference to others, and then a registered user-used character string is fetched. After that, a conjecture take-head-out candidate of other time and a registered basic character are fetched. In this case, since the time of the input is 8:00 AM in this example, a frequency of time of morning takes priority over all. Next, a candidate which has been automatically registered is fetched. And then, other conjecture take-head-out candidates are fetched. When a automatic registration exist, a character string which has been automatically registered is fetched in preference to a registered character string having a time band except for morning.

EXAMPLE 2

An example 2 is processing under existence of a user registration.

As shown in a table 4 as an example, it is assumed that Hiragana "あじあ (ajia) (Asia)" as an index of registration (reading) has been registered, and "Asia" as contents of registration has been registered in the user registration dictionary 8.

TABLE 4

| Index (reading) of registration | Contents (Kanji) of registration |
|---|---|
| あじあ(ajia) (Asia) | Asia |

Figure 19:
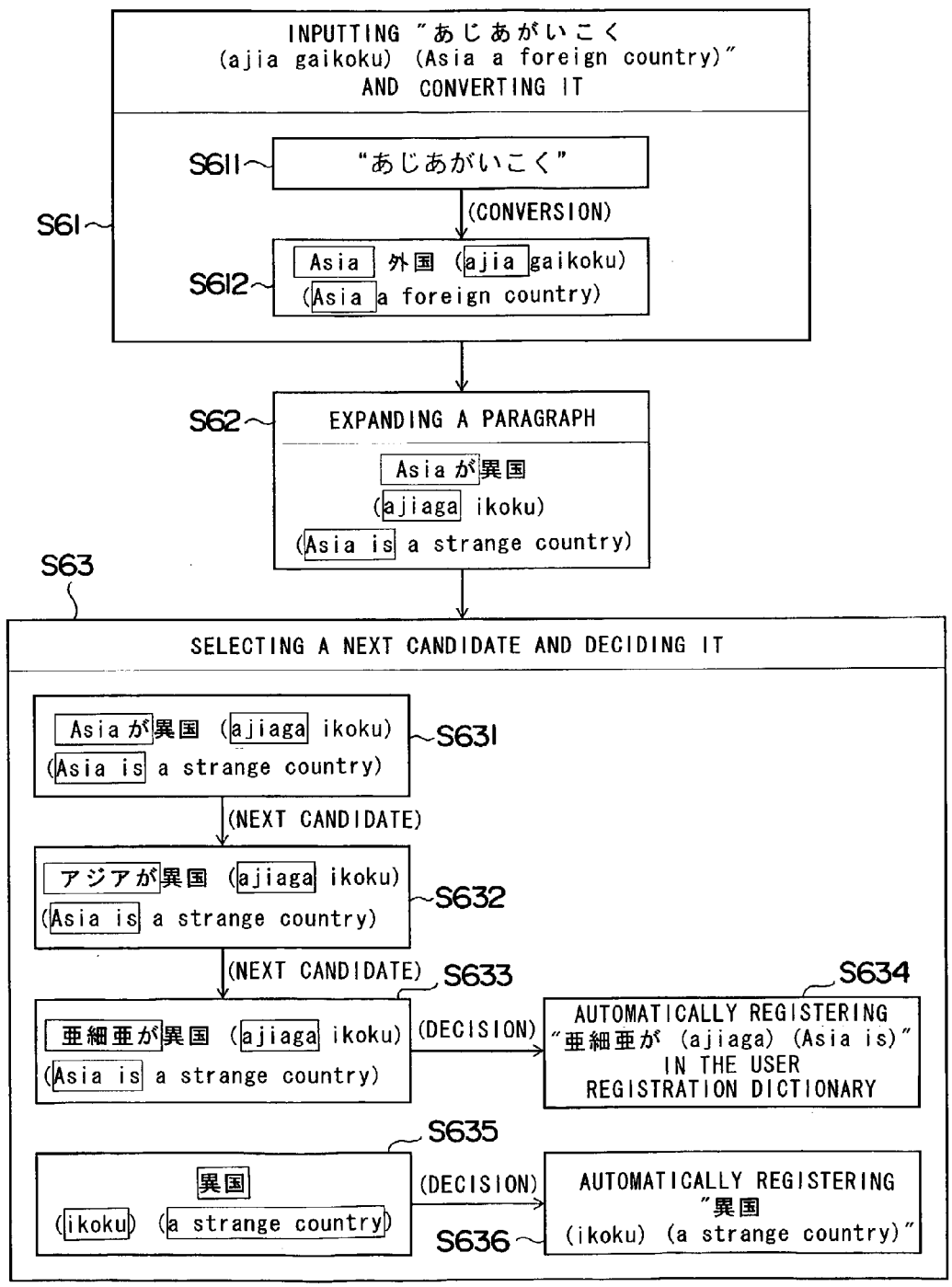
FIG. 19 is a flow diagram showing input, conversion and registration processing to a user registration dictionary.

In this case, as shown in FIG. 19 as an example, input and conversion processing is performed at a step S61, expansion processing of a paragraph is performed at a step S62, and decision processing is performed in a step S63. In the step S61, a character string "あじあ がいこく(ajia gaikoku) (Asia a foreign country)" is inputted at a step S611, and the conversion key 16 is pressed. Thereby, as shown in a step S612, the character string is converted into "Asia 外国(Asia gaikoku) (Asia a foreign country)". At a step S612, the paragraph "Asia" is selected from the character string "Asia 外国(Asia gaikoku) (Asia a foreign country)". If the paragraph "Asia" is expanded and displayed at the step S62, "Asia が外国(Asiaga ikoku) (Asia is a strange country)" is displayed. At this, the paragraph "Asia が(Asiaga) (Asia is)" is selected from the character string "Asia が 外国(Asiaga ikoku) (Asia is a strange country)" at a step S631 of the step S63, and an next candidate "アジア が(ajiaga) (Asia is)" is displayed at a step S632. And then, an character string "亜細亜 が(ajiaga) (Asia is)" is fetched at a step S633. At this, when the decision key 17 is pressed, the character string "亜細亜 が(ajiaga) (Asia is)" is decided at a step S634, and this character string is registered in the user registration dictionary 8. In addition, if the decision key 17 is pressed after "異国(ikoku) (a strange country)" is selected at a step S635, the character string "異国 (ikoku) (a strange country)" is decided and registered in the user registration dictionary at a step S636.

Figure 20:
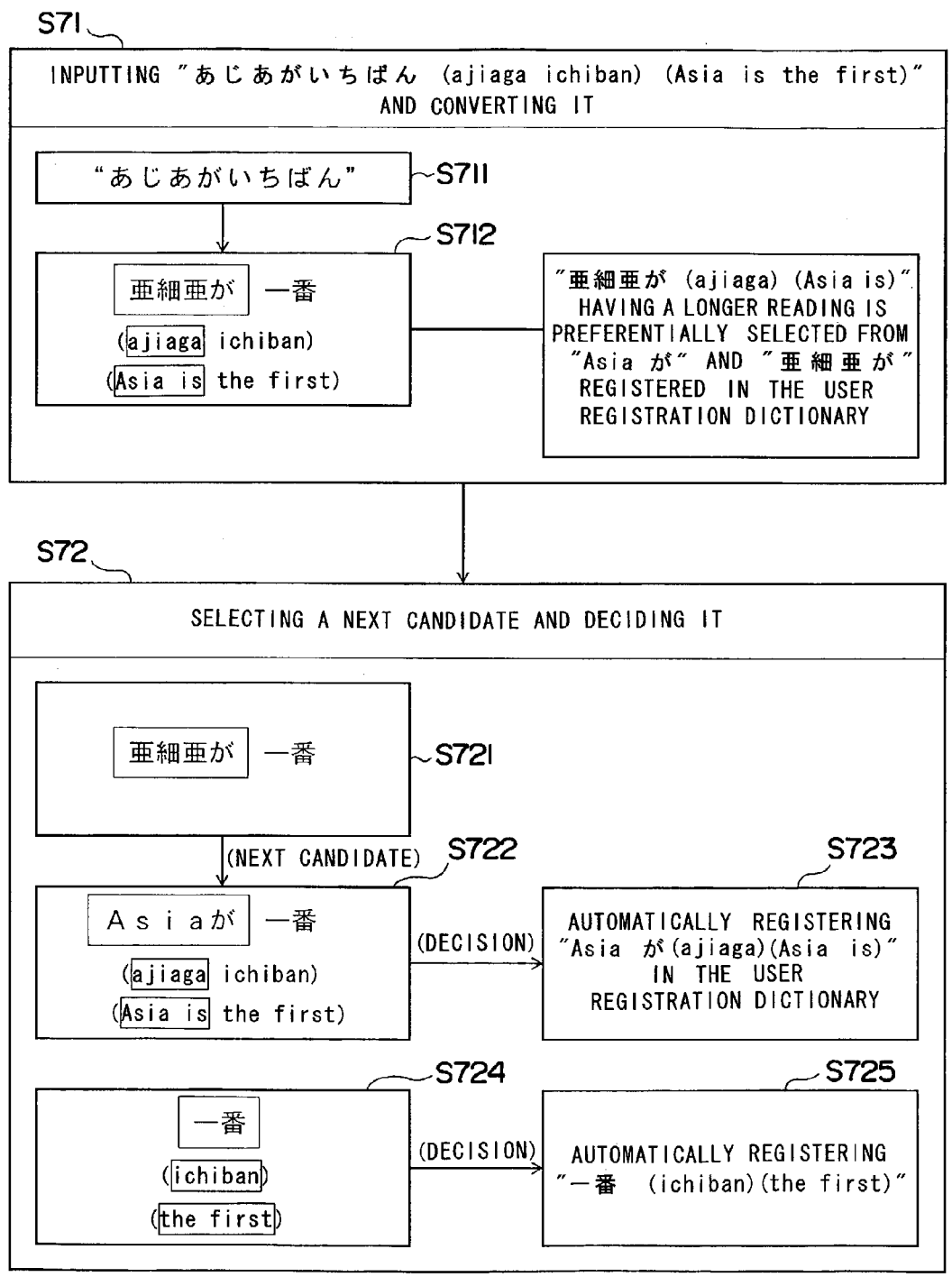
FIG. 20 is a flow diagram showing input, conversion and registration processing which uses a user registration dictionary.

After the above registration, as shown in FIG. 20, it is assumed that a character string "あじあ がいちばん(ajiaga ichiban) (Asia is the first)" is inputted, and this character string is converted in the step S71. If the conversion key 16 is pressed after a selection of "あじあ がいちばん(ajiaga ichiban) (Asia is the first)" at the step S711, this character string is changed into "亜細亜が 一番(ajiaga ichiban) (Asia is the first)" at the step S712. In this case, in respect to the character string "あじあ (ajia) (Asia)", character strings "Asia" and "亜細亜が (ajiaga) (Asia is)" have been registered as conversion candidates. A selection of "亜細亜が (ajiaga) (Asia is)" having a longer length namely a longer reading is preferentially performed. Then, in processing of a step S72 in which an next candidate is selected and decided, a paragraph "亜細亜が (ajiaga) (Asia is)" is selected from the character string "亜細亜が 一番(ajiaga ichiban) (Asia is the first)" at the step S721, and an next candidate is made display. If the decision key 17 is operated after selecting "Asia が(Ajiaga) (Asia is)" at a step S722, the character string "Asia が(Ajiaga) (Asia is)" is automatically registered in the user registration dictionary 8 at a step S723. In addition, if the decision key 17 is pressed after selecting "一番(ichiban) (the first)" at a step S724, the character string "一番 (ichiban) (the first)" is decided and is automatically registered in the user registration dictionary at a step S725.

Figure 21:
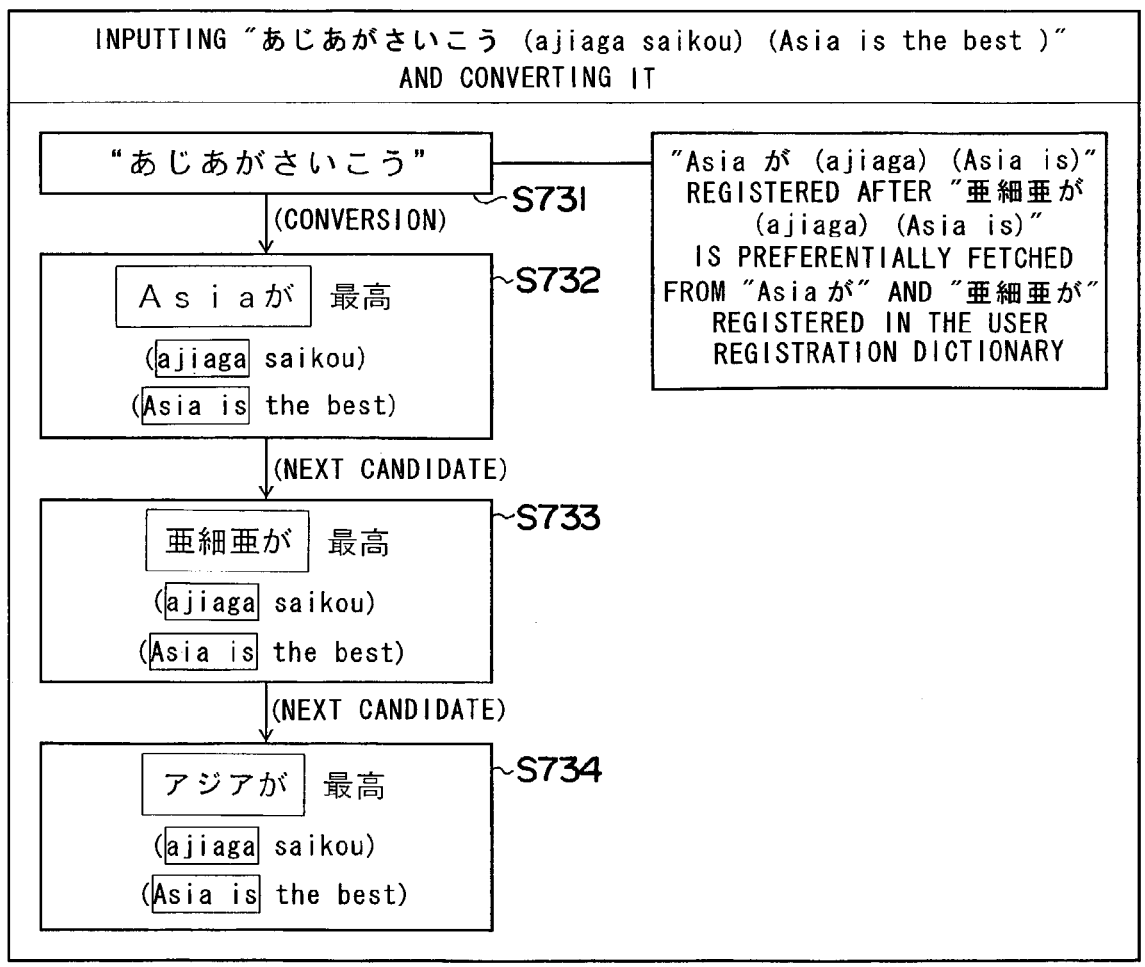
FIG. 21 is a flow diagram showing input and conversion processing which uses a user registration dictionary.

After the above automatic registration processing, for example, it is assumed that a character string "あじあ がさいこう(ajiaga saikou) (Asia is the best)" is inputted and converted as shown in FIG. 21. If the conversion key 16 is pressed after the input of "あじあ がさいこう(ajiaga saikou) (Asia is the best)" in the step S731, "Asia が(Ajiaga) (Asia is)" registered at the latest is preferentially fetched from "亜細亜が(ajiaga) (Asia is)" and "Asia が(Ajiaga) (Asia is)" registered in the user registration dictionary 8. Therefore, as shown in steps S732–S734, an next candidate becomes in order of "Asia が最高(ajiaga saikou) (Asia is the best)", "亜細亜が最高(ajiaga saikou) (Asia is the best)" and "アジアが最高(ajiaga saikou) (Asia is the best)".

EXAMPLE 3

An example 3 is processing under input of one character (the time of the input is 8:00 AM)

As shown in a table 5 as an example, it is assumed that a character "虎 (tora) (tiger)" has been registered in association with "や (ya)" of the index of registration in the user registration dictionary 8.

TABLE 5

| Index (reading) of registration | Contents (Kanji) of registration |
|---|---|
| や (ya) | 虎(tora)(tiger) |

Figure 22:
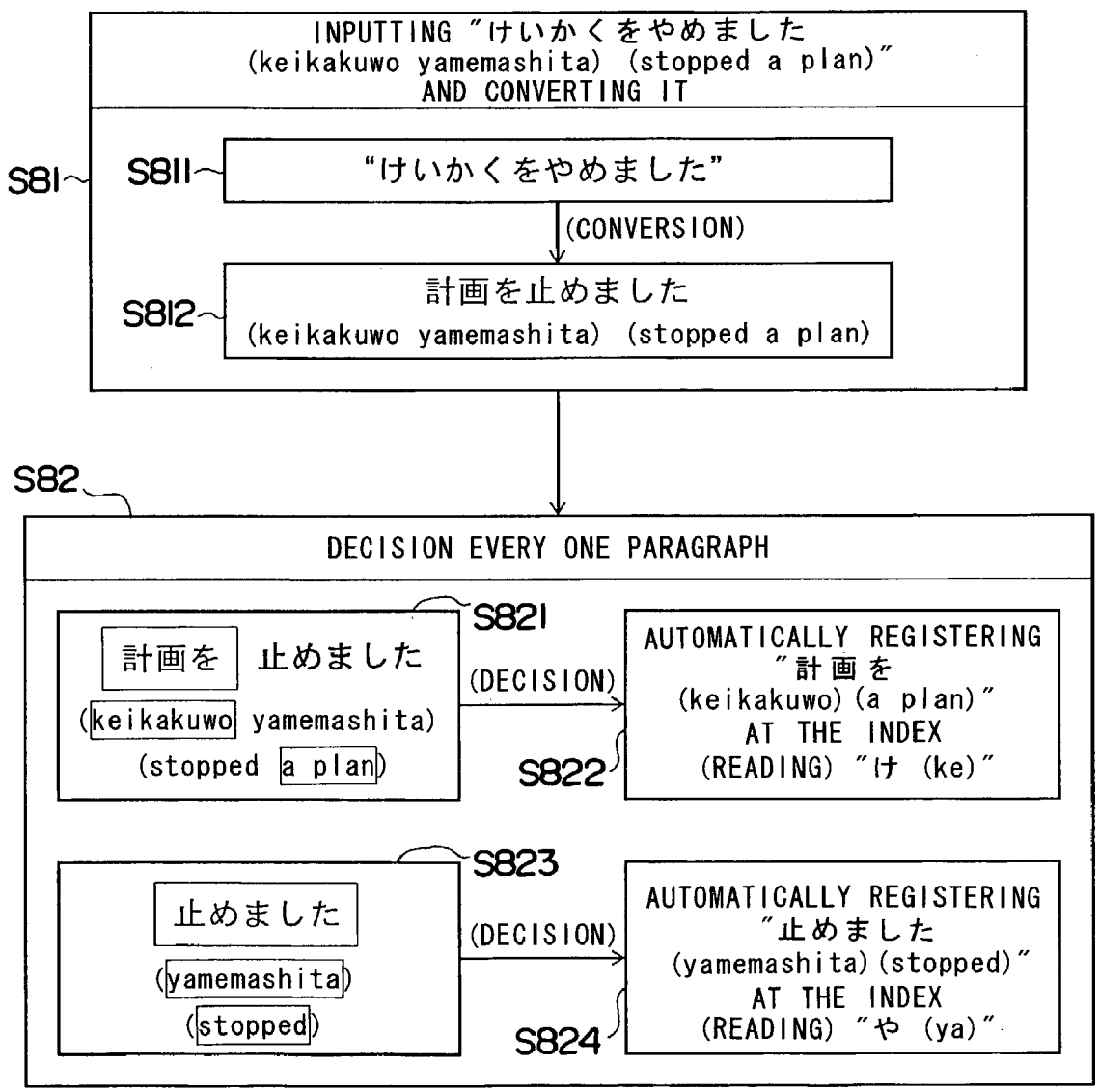
FIG. 22 is a flow diagram showing input, conversion and registration processing which uses a user registration dictionary.

In this case, as shown in FIG. 22 as an example, an input and conversion processing is performed at a step S81, and decision processing is performed at a step S82. That is, the character string "けい かくをやめました(keikakuwo yamemashita) (stopped a plan)" is inputted at a step S811. Under this state, if conversion is performed by pressing the conversion key 16, this character string is converted into "計画を止めました(keikakuwo yamemashita) (stopped a plan)" at a step S812. In this case, "計画 (keikaku) (a plan)" and "止(ya)" are converted from Hiragana to Kant.

At the step S82, the decision processing is performed every one paragraph of the character string "計画を止 めました(keikakuwo yamemashita) (stopped a plan) ". That is, at steps S821 and S822, in respect to "計画を止 めました(keikakuwo yamemashita) (stopped a plan)", a first paragraph "計画 を(keikakuwo) (a plan)" is automatically registered in the user registration dictionary 8 in association with "け (ke)" of the index. At steps S823 and S824, a second paragraph "めました (yamemashita) (stopped)" is automatically registered in the user registration dictionary 8 in association with "や (ya)" of the index.

Figure 23:
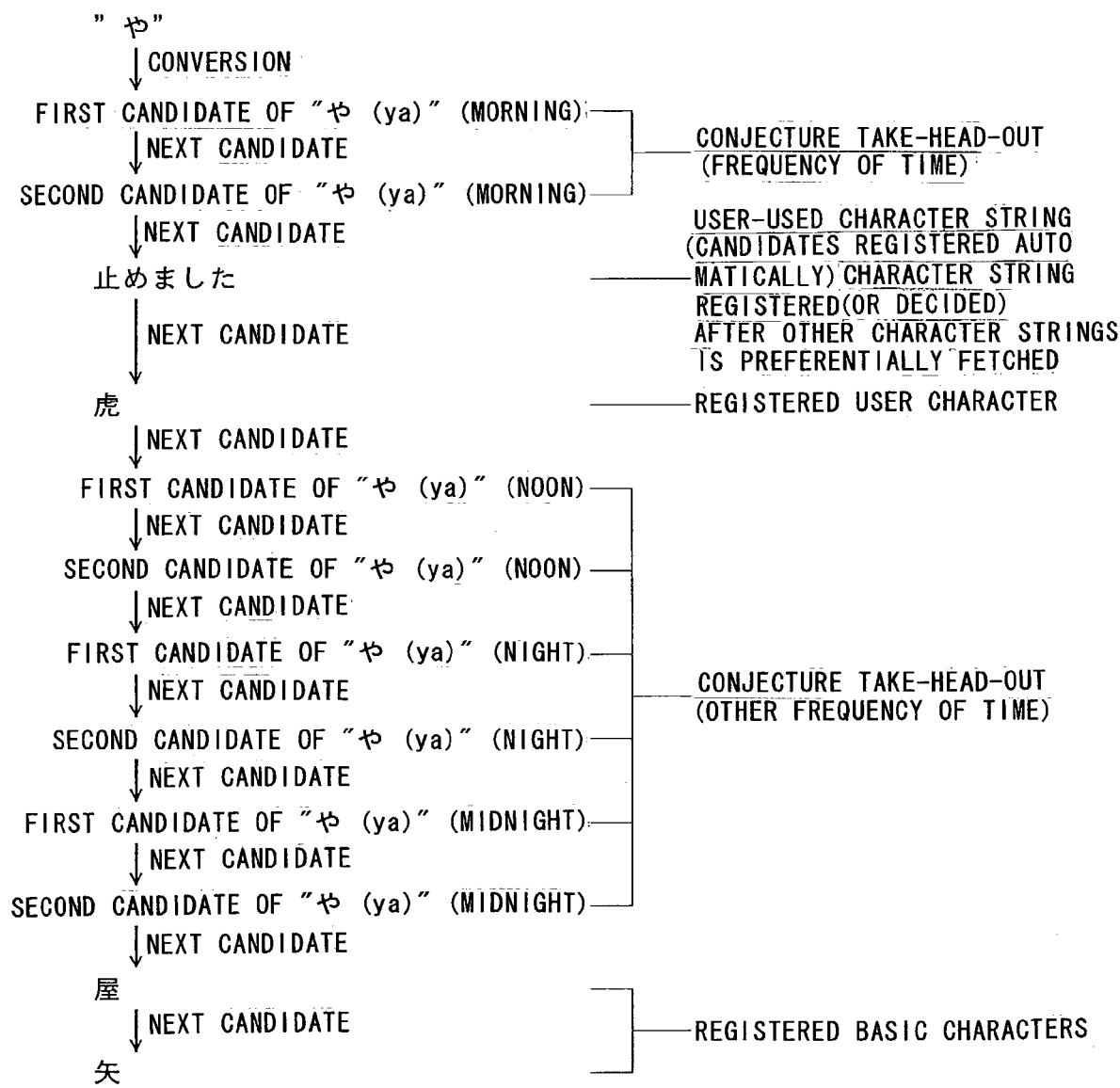
FIG. 23 is a drawing showing conversion processing of a single character and a dictionary which is used.

After the above registration processing, when the conversion key 16 is pressed after input of one character "や (ya)", as shown in FIG. 23 as an example, a candidate having a higher frequency of time is fetched by referring to the time information, and after that, the newest registered character string "止めま した(yamemashita) (stopped)" and the character "虎 (tora) (tiger)" registered by the user are fetched as next candidates. That is, a conjecture take-head-out candidate having a higher frequency of time is fetched in preference to others, and then a registered user-used character string is fetched. After that, a conjecture take-head-out candidate of other time and a registered basic character are fetched. In this case, since the time of the input is 8:00 AM in this example, a frequency of time of morning takes priority over all. Next, a candidate which has been automatically registered is fetched. And then, other conjecture take-head-out candidates are fetched. When an automatic registration exist, a character string which has been automatically registered is fetched in preference to a registered character string having a time band except for morning.

In this case, although "矢 (ya)" is fetched as the last candidate next to "屋 (ya)", the user registration dictionary 8 does not perform the automatic registration, even if the conversion key 17 is pressed after selection of the character "矢 (ya)". This is a reason that "矢 (ya)" has been registered already in the basic dictionary 9 in association with "や (ya)" of the conversion object. Although the automatic registration is checked when this processing is performed, the order of read-out is changed by function of learning of frequency.

Figure 24:
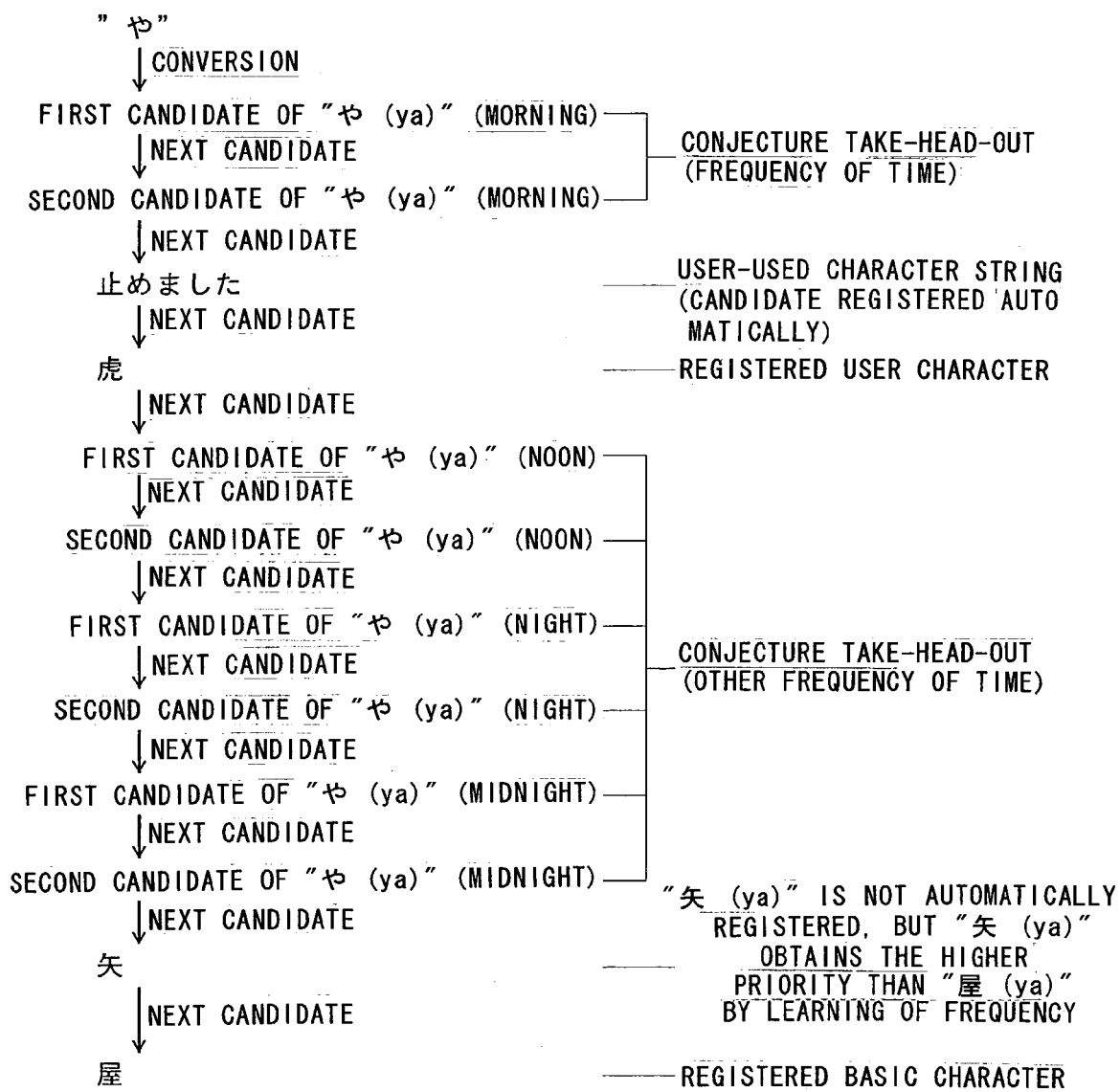
FIG. 24 is a drawing showing conversion processing of a single character and a dictionary which is used.

When one character "や (ya)" is inputted and the conversion key 16 is pressed, conversion processing like FIG. 23 is performed. However, as shown in FIG. 24 as an example, the last candidate is changed from "矢 (va)" to "屋 (ya)", and priority order of "矢 (ya)" becomes higher by a frequency learning. That is, a history function as a frequency learning is performed.

As descried in detail, the basic dictionary 9, the user registration dictionary 8 and the conjecture conversion dictionary 34 are used. The basic dictionary 9 stores the basic registrations relating to a character or character string, and the user registration dictionary 8 and the conjecture conversion dictionary 34 store the registrations relating to a character or character string used by a user. The conjecture conversion dictionary 34 stores the desired registrations together with the time information in association with the conversion object which is a reading namely one character in a head of a desired registration. Because of this, the desired registration can be fetched by using the conversion object and the time information. For example, the conjecture conversion dictionary 34 is set to the first priority, the user registration dictionary 8 is set to the second priority, and the basic dictionary 9 is set to the third priority. By this, a desired conversion candidate or a desired conversion result can be fetched by way of the optimum and quick conversion processing. Furthermore, since the registrations concerning a character or character string are selected and stored based on the operation of the decision key 17, the quick registration is performed. In addition, according to the above processing system, the system is personalized in response to a frequency of use by a user. And, intelligence of the character conversion and the conjecture conversion can be obtained, and a serviceable system can be made change.

The processing system shown in FIG. 15 (the fourth embodiment) may include the time band modification part 30 (the second embodiment) and/or the priority changing part 32 (the third embodiment). By this, the relation between a conversion candidate or a conversion result and the time information can be changed. And, the priority order of read-out of a conversion candidate from the user registration dictionary 8 and the conjecture conversion dictionary 34 can be changed.

Figure 25:
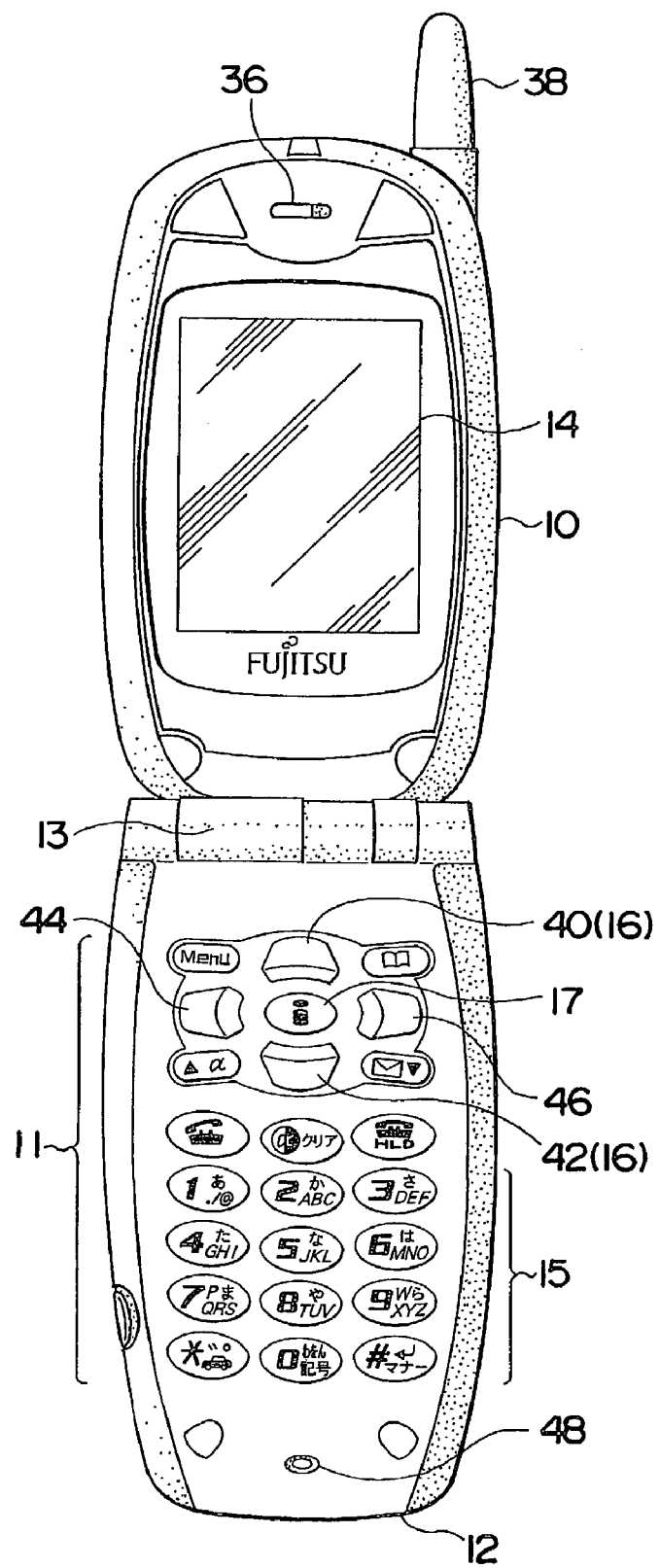
FIG. 25 is a front view showing a mobile telephone which can input/output with the Japanese and English languages.

The processing system according to the present invention, as shown in FIG. 25 as an example, can be realized as a mobile telephone capable of performing an input processing of the Japanese language. In this mobile telephone, a display unit 10 is provided to a telephone body 12 by way of a hinge 13 so that the display unit 10 is opened and closed. A display region 14 forming an input field is provided in the display unit 10, and a speaker 36 and an antenna 38 are attached to the display unit 10. An input unit 11 is provided in the telephone body 12. The input unit 11 has a plurality of character keys 15, cursor keys 40, 42, 44 and 46, a conversion key 16, a decision key 17 and other keys. The cursor keys 40, 42, 44 and 46, the conversion key 16 and the decision key 17 are provided above the character keys 15. The character keys 15 are arranged in a 3-by-4 array. The cursor keys 40, 42, 44 and 46 are used for operating the cursor 19 (FIG. 2) displayed on the display region 14 in every direction. The conversion key 16 and the decision key 17 are composed by cursor keys 40 and 42. A microphone is further provided in the telephone body 12.

Figure 26:
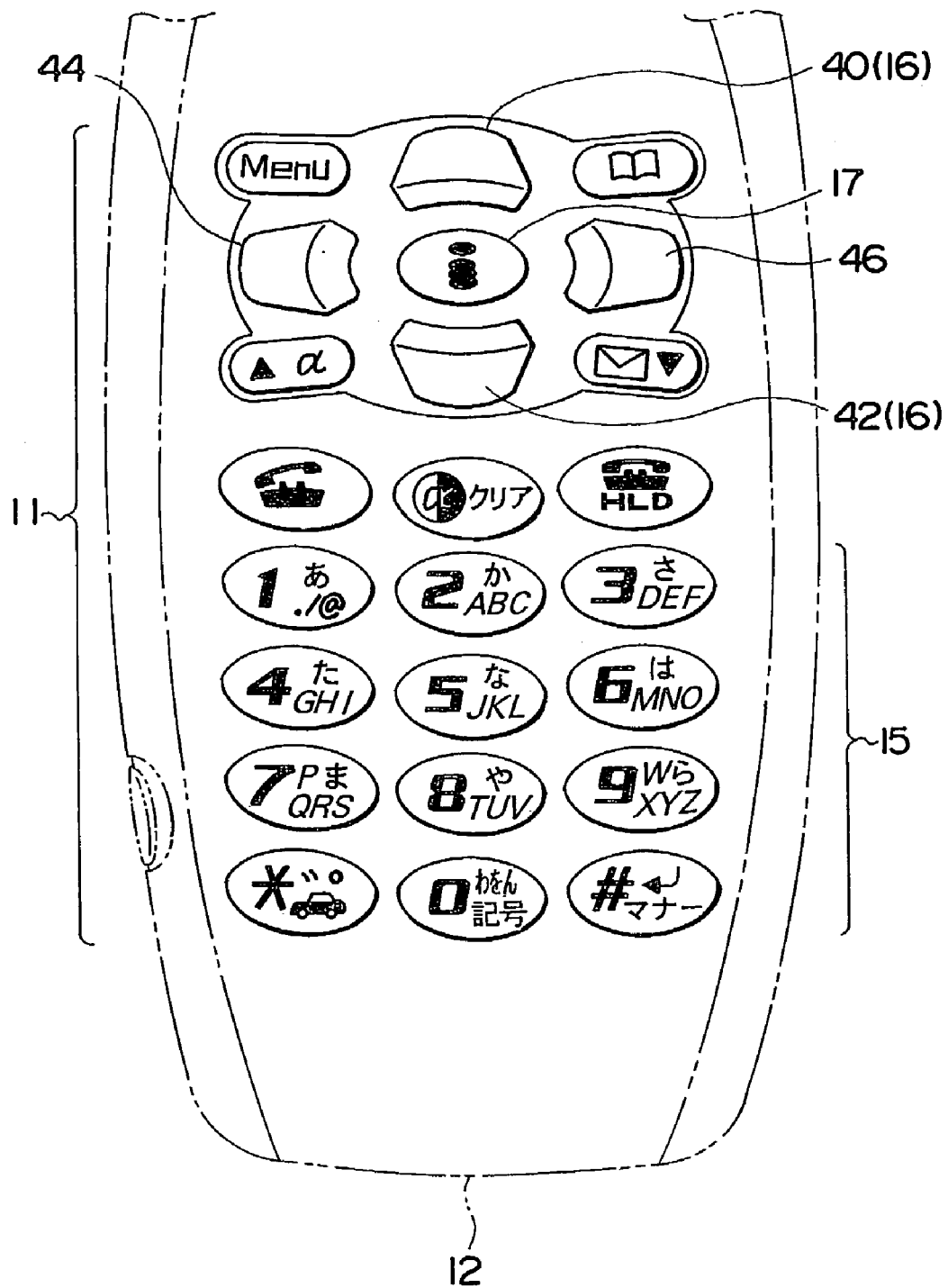
FIG. 26 is a drawing showing an input unit of the mobile telephone showing in FIG. 25.

The processing system according to the present invention can be constituted as a mobile telephone for the Japanese language area and the English language area. In the mobile telephone for the Japanese language area, as shown in FIG. 26 as an example, Hiragana of the Japanese language, alphabet, a symbol and so on are assigned on the character keys 15 of the telephone body 12.

As described above, if the processing system according to the first through the fourth embodiments is installed in the mobile telephone, various information processing including the predictive conversion and the conversion processing to a conversion candidate or a conversion result of a conversion object can be performed.

By utilizing this processing system, as shown in a table 6 as an example, conversion candidates representative of a greeting corresponding to a time band can be fetched by using "お (o)" in a head of a conversion candidate as a common inputted character.

TABLE 6

| Inputted character | Conversion candidate | Time band |
|---|---|---|
| お (o) | おはよう (ohayou)(good morning) | Morning |
| お (o) | おつかれ (otsukare)(good work today) | Noon |
| お (o) | おつかれ (otsukare)(good work today) | Night |
| お (o) | おやすみ (oyasumi)(good night) | Midnight |

In addition, in case of constituting as a mobile telephone for the English language area, an alphabet may be shown on the character key 15 instead of Hiragana of the Japanese language shown on the character keys 15 of the input unit 11 of FIG. 25 and FIG. 26.

As the processing system for the English language area, as shown in a table 7 as an example, conversion candidates representative of a greeting corresponding to a time band can be fetched by using "G" of the head character of a conversion candidate as a common inputted character and by referring to the time information.

TABLE 7

| Inputted character | Conversion candidate | Time band |
|---|---|---|
| G | Good morning | Morning |
| G | Good afternoon | Noon |
| G | Good evening | Night |
| G | Good night | Midnight |

Figure 27:
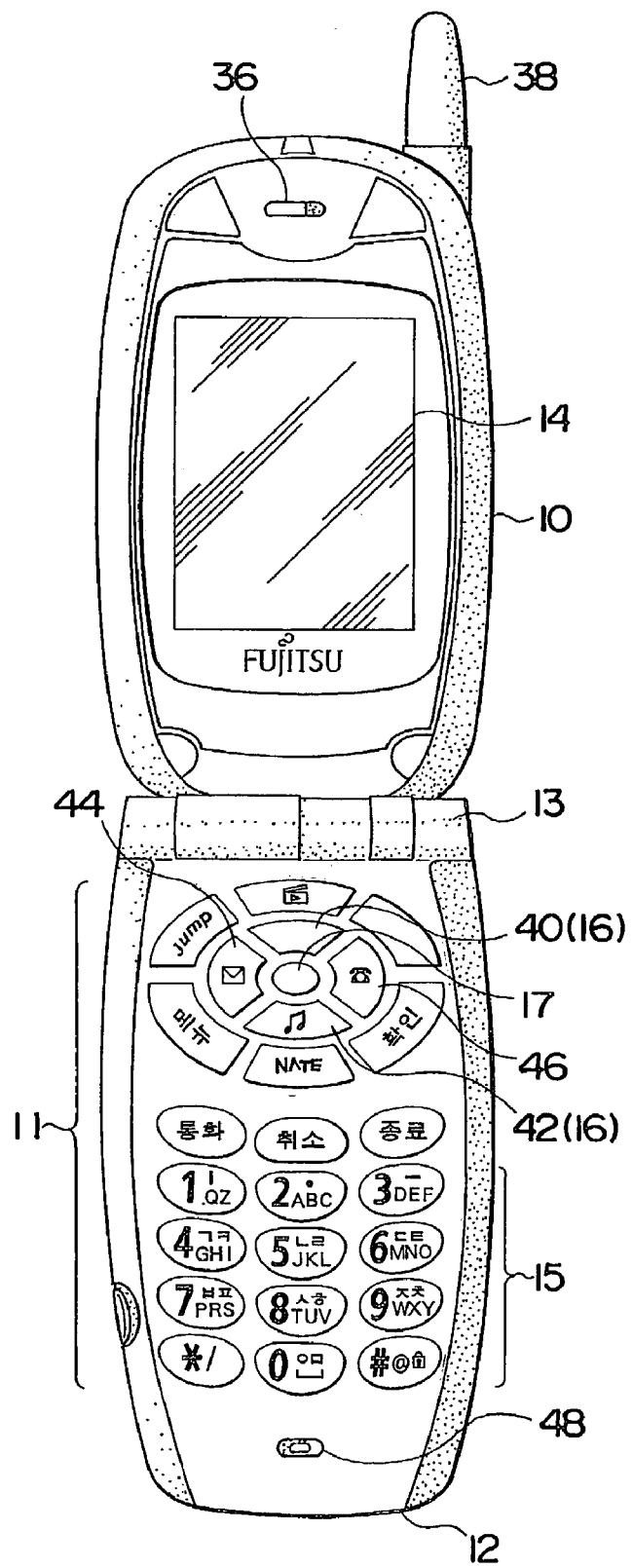
FIG. 27 is a front view showing a mobile telephone which can input/output with the Korean and English languages.
Figure 28:
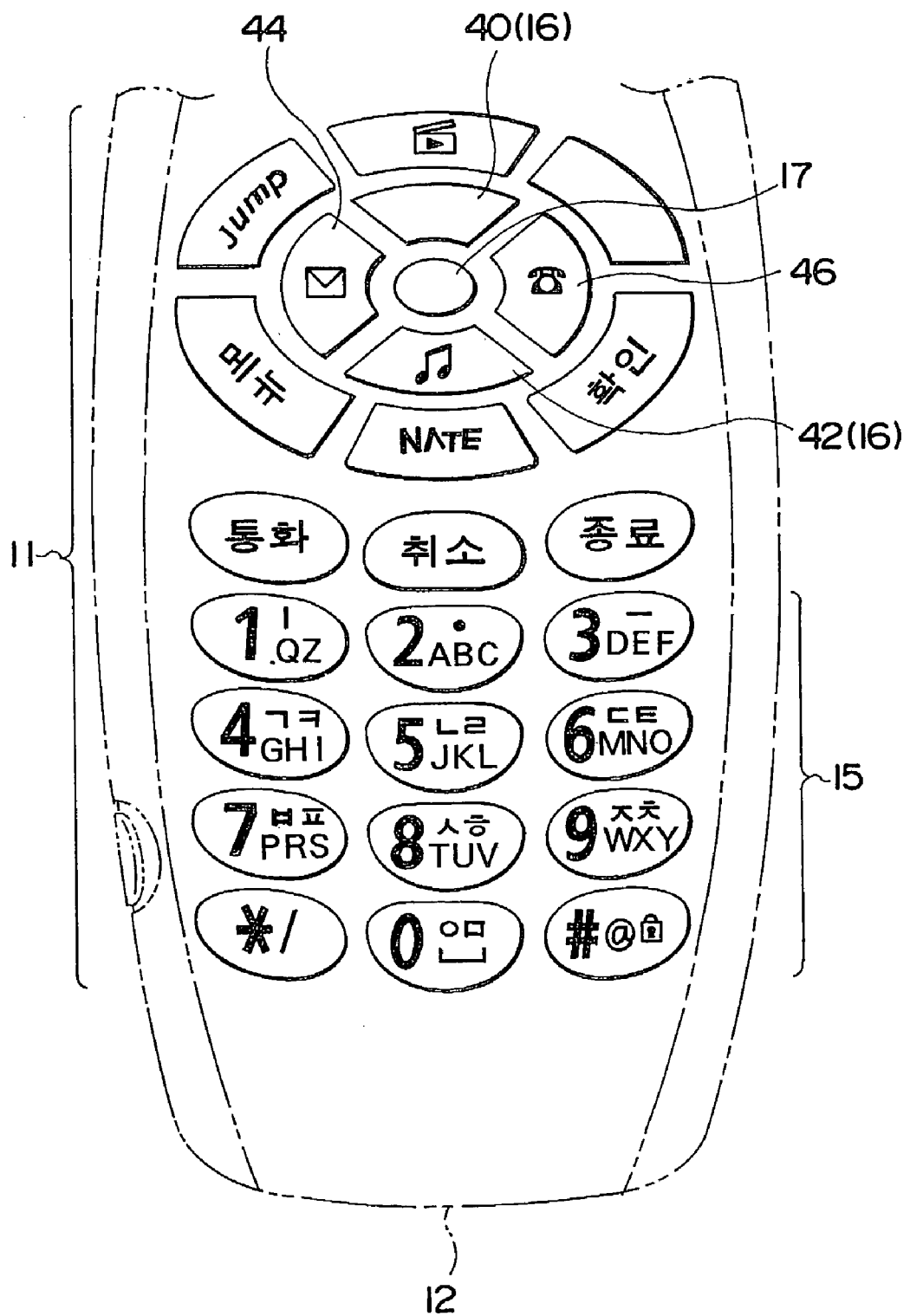
FIG. 28 is a drawing showing an input unit of the mobile telephone showing in FIG. 27.

The processing system according to the present invention can be realized as a mobile telephone for the Korean language area. This mobile telephone can be constituted as shown in FIG. 27 as an example. In this mobile telephone, as shown in FIG. 28 as an example, a consonant, a vowel and a batchim are assigned on the character keys 15 of the input unit 11.

According to the above mobile telephone, by using the processing system according to the present invention, a voiceless consonant which is an element of a letter in a head of a conversion candidate is used as an input character namely the conversion object, and reference of the time information representative of a time band is performed. By this, as shown in a table 8 as an example, conversion candidates representative of a greeting different at a time band can be fetched every time band by using a common inputted character. That is, a conversion candidate which a user expects and predicts can be fetched.

TABLE 8

| Inputted character | Conversion candidate | Time band | Signification |
|---|---|---|---|
| ㅇ | 안녕히 주무셨습니까 | Morning | Good morning |
| ㅇ | 안녕하십니까 | Noon | Good afternoon |
| ㅇ | 안녕히 주무심시오 | Night | Good night |
| ㅇ | 아직 안 주무시고 계셨습니까 | Midnight | You still sit up, don't you? |

In this case, as shown in a table 9 as an example, "x" in alphabet may also be used as the inputted character representative of the voiceless consonant in the character of the head. Likewise, by the reference of the time information representative of a time band, a conversion candidate which a user expects and predicts can be fetched every time band.

TABLE 9

| Inputted character | Conversion candidate | Time band | Signification |
|---|---|---|---|
| x | 안녕히 주무셨습니까 | Morning | Good morning |
| x | 안녕하십니까 | Noon | Good afternoon |
| x | 안녕히 주무심시오 | Night | Good night |
| x | 아직 안 주무시고 계셨습니까 | Midnight | You still sit up, don't you? |

In addition, in this case, as shown in a table 10 as an example, one character in the head of the conversion candidate may also be used as the inputted character. Likewise, by the reference of the time information representative of a time band, a conversion candidate which a user expects and predicts can be fetched every time band.

TABLE 10

| Inputted character | Conversion candidate | Time band | Signification |
|---|---|---|---|
| 早上好 | 中午好 | Morning | Good morning |
| 早上好 | 晚上好 | Noon | Good afternoon |
| 早上好 | 안 주무시고 | Night | Good night |
| 早上好 | 계셨습니까 ㅈ | Midnight | You sit up, don't you? |

In addition, as shown in a table 11 as an example, pronunciation (reading) of one character in the head, namely, a combination of "x" representative of the voiceless consonant, a vowel "a" and a voiced consonant "n" may also be used as the input character. Likewise, by the reference of the time information representative of a time band, a conversion candidate which a user expects and predicts can be fetched every time band.

TABLE 11

| Inputted character | Conversion candidate | Time band | Signification |
|---|---|---|---|
| xan | 中午好 | Morning | Good morning |
| xan | 晚上好 | Noon | Good afternoon |
| xan | 안 주무시고 | Night | Goodnight |
| xan | 계셨습니까 ㅈ | Midnight | You sit up, don't you? |

In addition, as shown in a table 12 as an example, pronunciation (reading) of a part of one character in the head, namely, a combination of "a" representative of the vowel and the voiced consonant "n" may also be used as the inputted character. Likewise, by the reference of the time information representative of a time band, a conversion candidate which a user expects and predicts can be fetched every time band.

TABLE 12

| Inputted character | Conversion candidate | Time band | Signification |
|---|---|---|---|
| an | 안녕히 주무셨습니까 | Morning | Good morning |
| an | 안녕하십니까 | Noon | Good afternoon |
| an | 안녕히 주무십시오 | Night | Good night |
| an | 안 주무시고 계셨습니까 | Midnight | You sit up, don't you? |

In another registered character string of the Korean language, as shown in a table 13 as an example, a consonant which is an element of a letter in a head of a conversion candidate is used as the conversion object, and reference of the time information representative of a time band is performed. By this, a different conversion candidate can be fetched every time band by using a common inputted character.

TABLE 13

| Inputted character | Conversion candidate | Time band | Signification |
|---|---|---|---|
| ㅈ | 잘 잤어? | Morning | Did you sleep well? |
| ㅈ | 잘 지내 | Noon | Good afternoon |
| ㅈ | 잘 자 | Night | Good night |
| ㅈ | 졸려 | Midnight | I'm sleepy, how about you? |

In this case, as shown in a table 14 as an example, by using "j" as a common inputted character representative of pronunciation, a conversion candidate may be similarly fetched.

TABLE 14

| Inputted character | Conversion candidate | Time band | Signification |
|---|---|---|---|
| J | 잘 잤어? | Morning | Did you sleep well? |
| J | 잘 지내 | Noon | Let's hit it off. |
| J | 잘 자 | Night | Good night |
| J | 졸려 | Midnight | I'm sleepy, how about you? |

Figure 29:
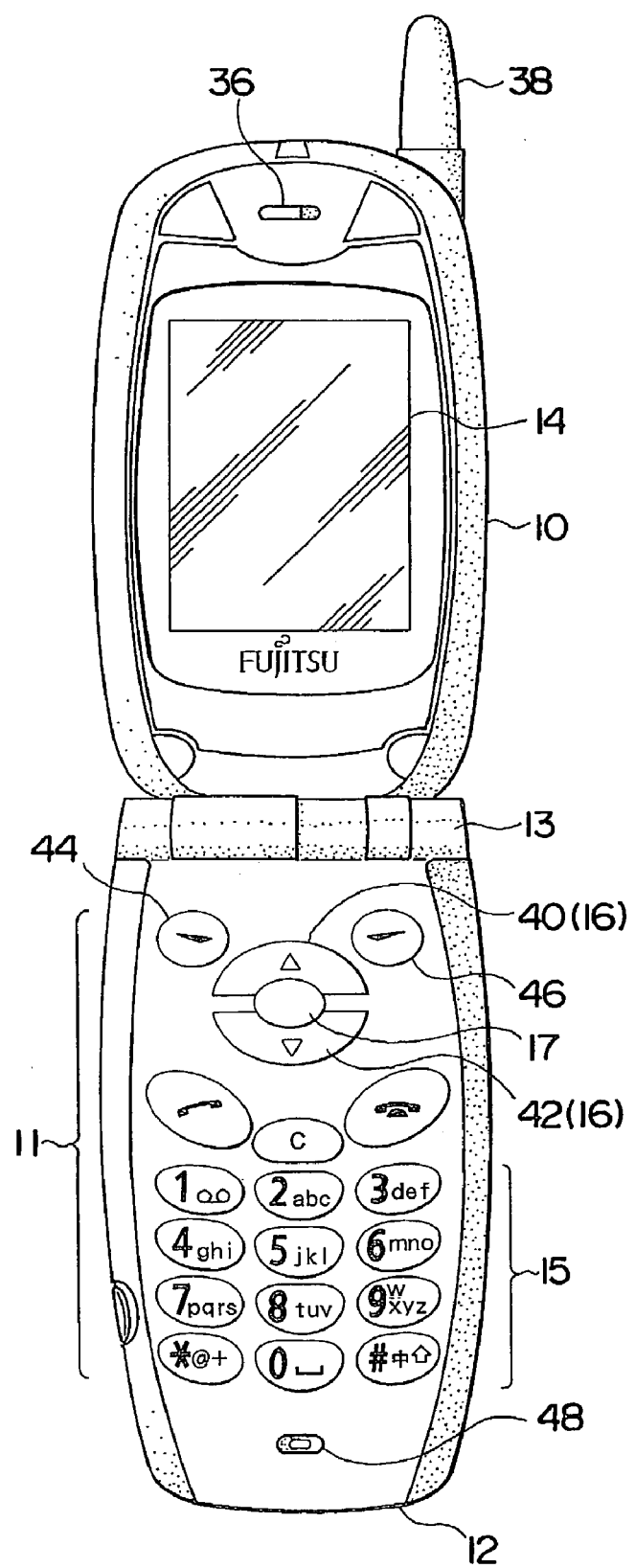
FIG. 29 is a front view showing a mobile telephone which can input/output with the Chinese and English languages.
Figure 30:
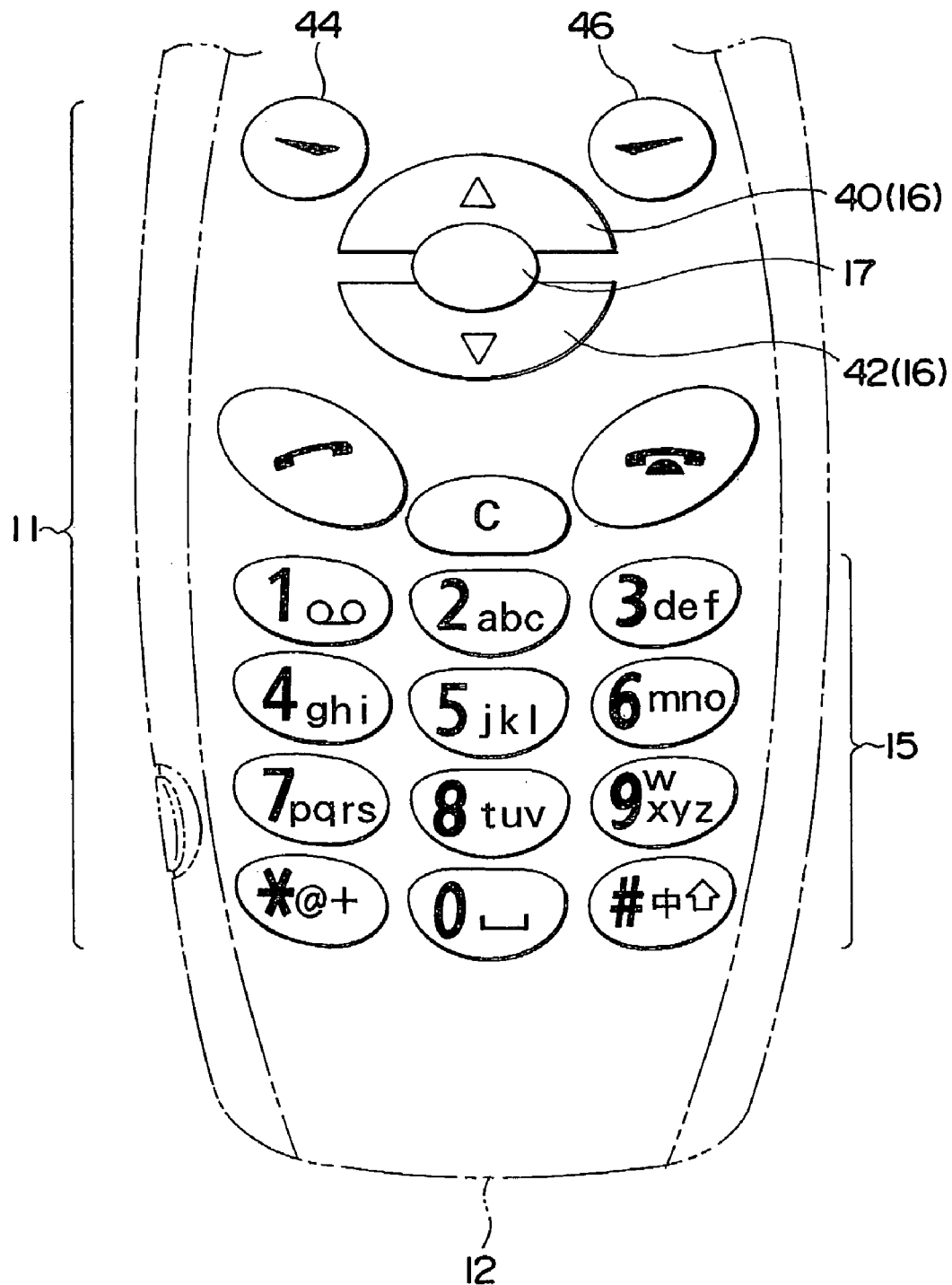
FIG. 30 is a drawing showing an input unit of the mobile telephone showing in FIG. 29.

The processing system according to the present invention can be realized as a mobile telephone for the Chinese language area. This mobile telephone can be constituted as shown in FIG. 29 as an example. In this mobile telephone, as shown in FIG. 30 as an example, an alphabet representative of pronunciation of the Chinese language is assigned on the character keys 15 of the input unit 11. In this case, instead of the alphabet, an element composing Chinese character may be assigned.

According to the above mobile telephone, by using the processing system according to the present invention, a voiceless consonant which is an element of a letter in a head of a conversion candidate is used as an input character namely the conversion object, and reference of the time information representative of a time band is performed. By this, as shown in a table 15 as an example, a conversion candidate representative of a greeting different at a time band can be fetched every time band by using a common inputted character "n". That is, a conversion candidate which a user expects and predicts can be fetched.

TABLE 15

| Inputted character | Conversion candidate | Time band | Signification |
|---|---|---|---|
| N | 你好 | Morning | Good morning |
| N | 你吃了吗? | Noon | Didn't you have a lunch |
| N | 你还没睡吗? | Night | Aren't you asleep yet? |
| N | 你早点睡吧! | Midnight | How about sleeping? |

In this case, as shown in a table 16 as an example, two characters "ni" composed of a consonant and a vowel may be used as an input character.

TABLE 16

| Inputted character | Conversion candidate | Time band | Signification |
|---|---|---|---|
| Ni | 你好 | Morning | Good morning |
| Ni | 你吃了吗? | Noon | Didn't you have a lunch? |
| Ni | 你还没睡吗? | Night | Aren't you asleep yet? |
| Ni | 你早点睡吧! | Midnight | How about sleeping? |

Although a character in a head is used as an inputted character in the above examples, a common character in an end of a character string can also be used as an inputted character. As shown in a table as an example, by using a common pronunciation "hao" in an end of a conversion candidate, a conversion candidate of a different greeting may be fetched every time band.

TABLE 17

| Inputted character | Conversion candidate | Time band | Signification |
|---|---|---|---|
| Hao | 早上好 | Morning | Good morning |
| Hao | 中午好 | Noon | Hello |
| Hao | 晚上好 | Night | Good evening |
| Hao | 晚上好 | Midnight | Good evening |

In the exemplified the tables 8–17, signification of a conversion candidate is described for convenience' sake. Although the signification is unnecessary in the conversion, the signification may be displayed for a user having different language.

(Other Embodiments)

Although a letter is used as the conversion object in the embodiments mentioned above, this is not intended to limit the scope of the invention. A symbol is used as the conversion object, and a conversion candidate or a conversion result may be fetched by referring to the time information. An element of a letter or a symbol may also be used as the conversion candidate, and a combination not less than two of a letter, a symbol or an element of a letter or a symbol may also be used as the conversion candidate. The conversion object can be optionally set in accordance with language.

Although a conversion candidate having a common character in a head or an end is used as shown in the tables 1–17 in the embodiments mentioned above, this is not intended to limit the scope of the invention. A conversion candidate having a common character in a head or an end has advantages in that recognition of a conversion candidate and usage to a user are easy, but these advantages relates to practice or proficiency of a user. Therefore, in the present invention, it is not always necessary that a conversion candidate has a common character in a head or an end. For example, a common character is set by using a concept of a greeting sentence, and the system is set so that a greeting sentence corresponding to a time band is preferentially fetched. By this, a conversion candidate or a conversion result in respect to a conversion object can be obtained. Therefore, a converted character string which a user expects or predicts can be fetched in response to a time band, and it makes a contribution to a quick and optimum conversion processing.

Concerning the information processing device, the information processing method, the information processing program and a program product containing the information processing program according to the present invention, although the first through the fourth embodiments are explained as the information processing system, it is possible to constitute a character input processing device, a character input processing method, a character input processing program and a program product containing a character input processing program.

Although the best mode for carrying out the invention, the object, the configuration and the operation and effect have been described in detail above, the invention is not limited to such embodiment for carrying out the invention, and it is a matter of course that the invention can be variously changed or modified on the basis of a gist and spirit of the invention as disclosed in claims and the detailed description of the invention, and such a change or modification, and various conjectured configurations, modified examples and so forth are included in the scope of the invention, and the description of the specification and drawings are not restrictively understood.

The disclosure of Japanese Patent Applications No.2002-113800 and No.2002-364168 including specification, claims, and drawings, is incorporated herein by reference.

What is claimed is:

1. An information processing device, comprising:
   a dictionary, in which time information and one or more conversion candidates corresponding to a conversion object are related and stored, said conversion object being a letter, a symbol, an element of a letter or a symbol, or a combination not less than two of these;
   a time detection part that detects a conversion time when inputted said conversion object is converted into said one or more conversion candidates and outputs time information corresponding to said conversion time;
   a conversion part that, by referring to said dictionary, based on inputted said conversion object and said time information outputted by said time detection part, converts said conversion object into one or more conversion candidates;
   a display part that displays said one or more conversion candidates converted by said conversion part; and
   a selection part that selects a conversion result out of said one or more conversion candidates displayed on said display part.

2. The device of claim 1, wherein said conversion part includes an order changing part that changes order of said conversion candidates by using said time information corresponding to said conversion time.

3. The device of claim 1, wherein said conversion part further includes a time modification part that modifies said time information related to said conversion result selected out of said one or more conversion candidates, by the time information corresponding to said conversion time.

4. The device of claim 1 further including:
   a specifying part that specifies said conversion result out of said one or more conversion candidates; and
   a registration part that relates said conversion result specified by said specifying part to said time information corresponding to said conversion time, and registers these into said dictionary.

5. The device of claim 1, wherein said time information represents a time range of morning, noon, night or midnight to which said conversion time belongs.

6. An information processing method for use in an information processing device, comprising the steps of:
- receiving an input of a conversion object, said conversion object being a letter, a symbol, an element of a letter or a symbol, or a combination not less than two of these;
- outputting time information indicating conversion time when inputted said conversion object is converted into one or more conversion candidates;
- converting said conversion object into one or more conversion candidates, by referring to a dictionary in which said time information and said one or more conversion candidates corresponding to said conversion object are related and stored, based on inputted said conversion object and said time information;
- displaying said one or more conversion candidates; and
- selecting a conversion result out of displayed said one or more conversion candidates.

7. The information processing method of claim 6, further including the steps of:
- deciding whether or not there is any difference between said time information related to said one or more conversion candidates and said time information at said conversion time;
- modifying said time information related to said one or more conversion candidates, based on said time information indicating said conversion time, if there is a difference therebetween; and
- registering said time information and said one or more conversion candidates in said dictionary, with said time information relating to said one or more conversion candidates.

8. The information processing method of claim 6, further comprising the steps of:
- receiving an instruction for converting said conversion object, into said one or more conversion candidates; and
- changing order of said conversion candidates by using said time information indicating conversion time when said conversion object is converted into said one or more conversion candidates, and registering these in said dictionary.

9. An information processing program for use in an information processing device, comprising the functions of:
- receiving an input of a conversion object, said conversion object being a letter, a symbol, an element of a letter or a symbol, or a combination not less than two of these;
- outputting time information indicating conversion time when inputted said conversion object is converted into one or more conversion candidates;
- converting said conversion object into one or more conversion candidates, by referring to a dictionary in which said one or more conversion candidates corresponding to said conversion object and said time information are related and stored, based on inputted said conversion object and said time information;
- displaying said one or more conversion candidates; and
- selecting a conversion result out of displayed said one or more conversion candidates.

10. The information processing program of claim 9, further comprising the functions of:
- receiving an instruction for converting said conversion object into said one or more conversion candidates; and
- changing order of said conversion candidates by using said time information indicating conversion time when said conversion object is converted into said one or more conversion candidates, and registering these in said dictionary.

11. The information processing program of claim 9, further including the function of:
- changing order of said conversion candidates in accordance with said time information when converting said conversion object into said one or more conversion candidates corresponding to said conversion object.

12. The information processing program of claim 9, further including the function of:
- modifying a relation between said time information and said one or more conversion candidates.

13. The information processing program of claim 9, further including the functions of:
- deciding whether or not there is any difference between said time information related to said one or more conversion candidates to be selected and time information specified by said conversion time; and
- modifying a relation between said time information and said one or more conversion candidates based on said decision result, and registering it in said dictionary.

14. A computer program product containing an information processing program recorded on a computer readable medium for use in an information processing device, the information processing program comprising the functions of:
- receiving an input of a conversion object, said conversion object being a letter, a symbol, an element of a letter or a symbol, or a combination not less than two of these;
- outputting time information indicating conversion time when inputted said conversion object is converted into one or more conversion candidates;
- converting said conversion object into one or more conversion candidates, by referring to a dictionary in which said one or more conversion candidates corresponding to said conversion object and said time information are related and stored, based on inputted said conversion object and said time information;
- displaying said one or more conversion candidates; and
- selecting a conversion result out of displayed said one or more conversion candidates.

15. The computer program product of claim 14, the information processing program further comprising the functions of:
- receiving an instruction for converting said conversion object, into said one or more conversion candidates; and
- changing order of said conversion candidates by using said time information indicating conversion time when said conversion object is converted into said one or more conversion candidates, and registering these in said dictionary.

16. The computer program product of claim 14, the information processing program further including the function of:
- changing order of said conversion candidates in accordance with said time information when converting said conversion object into said one or more conversion candidates corresponding to said conversion object.

17. The computer program of claim 14, the information processing program further including the function of:
- modifying a relation between said time information and said one or more conversion candidates.

18. The program product of claim 14, the information processing program further including the functions of:
- deciding whether or not there is any difference between said time information related to said one or more conversion candidates to be selected and time information specified by said conversion time; and modifying a relation between said time information and said one or more conversion candidates based on said decision result, and registering it in said dictionary.

19. A character input processing device for processing an inputted character, comprising:

a dictionary, in which time information and one or more conversion candidates corresponding to a conversion objective character are related and stored, said conversion objective character being a letter, a symbol, an element of a letter or a symbol, or a combination not less than two of these;

a time detection part that outputs a time when inputted said conversion objective character is converted into said one or more conversion candidates;

a conversion instruction part that instructs conversion of said conversion objective character when said conversion objective character is inputted from a character input part;

a conversion part that refers to said dictionary and decides at least one conversion result based on said time indicated by said time detection part when conversion of said conversion objective character is instructed from said conversion instruction part;

a display part that displays said one or more conversion candidates outputted by said conversion part; and a selection part that selects a conversion result out of said one or more conversion candidates displayed on said display part.

20. The character input processing device of claim 19, wherein said conversion part decides a plurality of conversion results, said conversion part further comprising:

a conversion result specifying part that specifies a conversion result from said conversion results; and a registering part that relates said conversion result specified by said conversion result specifying part to said time when said conversion objective character is converted, and memorizes these in said dictionary.

21. The character input processing device of claim 19, wherein said time represents a time range of morning, noon, night or midnight to which time for said conversion objective character to be converted belongs.

22. A character input processing method for use in an information processing device, comprising the steps of:

receiving an input of conversion objective character to extract one or more conversion candidates out of a dictionary in which one or more conversion candidates corresponding to said conversion objective character and a time corresponding to time element of said one or more conversion candidates are related and stored, said conversion objective character being a letter, a symbol, an element of a letter or a symbol, or a combination not less than two of these;

outputting time information corresponding to time when inputted said conversion objective character is converted into said one or more conversion candidates;

converting said conversion objective character into one or more conversion candidates, by referring to said dictionary, based on inputted said conversion objective character and said time information;

deciding a conversion result out of selected conversion candidates based on said time; and displaying said conversion result.

23. A character input processing program for use in a computer, comprising the functions of:

recognizing an inputted conversion objective character, said conversion objective character being a letter, a symbol, an element of a letter or a symbol, or a combination not less then two of these;

recognizing time indicated by a time detection part which detects said time for said conversion objective character to be converted into one or more conversion candidates;

deciding a conversion result of said conversion objective character out of a dictionary in which time and one or more conversion candidates corresponding to said conversion objective character are related and stored, based on said time; and displaying said decided conversion result.

* * * * *

UNITED STATES PATENT AND TRADEMARK OFFICE
CERTIFICATE OF CORRECTION

| | |
|---|---|
| PATENT NO. | : 7,188,304 B2 |
| APPLICATION NO. | : 10/413225 |
| DATED | : March 6, 2007 |
| INVENTOR(S) | : Youiti Morimoto et al. |

It is certified that error appears in the above-identified patent and that said Letters Patent is hereby corrected as shown below:

On The Title Page, Item (56) (Other Publications), Line 1, change "Sata" to --Data--.

Column 35, Line 35, change "object," to --object--.

Column 36, Line 44, change "object," to --object--.

Signed and Sealed this

Twenty-sixth Day of June, 2007

JON W. DUDAS
*Director of the United States Patent and Trademark Office*

UNITED STATES PATENT AND TRADEMARK OFFICE
CERTIFICATE OF CORRECTION

PATENT NO. : 7,188,304 B2  
APPLICATION NO. : 10/413225  
DATED : March 6, 2007  
INVENTOR(S) : Youiti Morimoto et al.

Page 1 of 3

It is certified that error appears in the above-identified patent and that said Letters Patent is hereby corrected as shown below:

Column 24, Line 43, change " 降ってていました " to -- 降っていました --.

Column 24, Line 51, change " 降ってていました " to -- 降っていました --.

Column 24, Line 61, change " 降ってていました " to -- 降っていました --.

Column 25, Line 49, change " 外国 " to -- 異国 --.

Column 25, Line 51, change " 外国 " to -- 異国 --.

Column 26, Line 54, change " 虎 " to -- や --

Column 27, Line 18, change " めました " to -- 止めました --.

Column 27, Line 60, change "va" to --ya--.

Column 31, Table 10, change

" [table image] " to

| Inputted character | Conversion candidate | Time band | Signification |
|---|---|---|---|
| 안 | 안녕히 주무셨습니까 | Morning | Good morning |
| 안 | 안녕하십니까 | Noon | Good afternoon |
| 안 | 안녕히 주무십시오 | Night | Good night |
| 안 | 안 주무시고 계셨습니까 | Midnight | You sit up, don't you ? |

--.

UNITED STATES PATENT AND TRADEMARK OFFICE
CERTIFICATE OF CORRECTION

PATENT NO. : 7,188,304 B2 Page 2 of 3
APPLICATION NO. : 10/413225
DATED : March 6, 2007
INVENTOR(S) : Youiti Morimoto et al.

It is certified that error appears in the above-identified patent and that said Letters Patent is hereby corrected as shown below:

Column 31, Table 11, change

" [original table image] " to

| Inputted character | Conversion candidate | Time band | Signification |
|---|---|---|---|
| xan | 안 녕 히 주 무 셨 습 니 까 | Morning | Good morning |
| xan | 안녕하심니까 | Noon | Good afternoon |
| xan | 안녕히 주무십시오 | Night | Good night |
| xan | 안 주무시고 계셨습니까 | Midnight | You sit up, don't you ? |

--.

Column 32, Table 13, change

" [original table image] " to

| Inputted character | Conversion candidate | Time band | Signification |
|---|---|---|---|
| ㅈ | 잘 잤어? | Morning | Did you sleep well? |
| ㅈ | 잘 지내 | Noon | Let's hit it off. |
| ㅈ | 잘 자 | Night | Good night |
| ㅈ | 졸려 | Midnight | I'm sleepy, how about you? |

--.

UNITED STATES PATENT AND TRADEMARK OFFICE
CERTIFICATE OF CORRECTION

| | |
|---|---|
| PATENT NO. | : 7,188,304 B2 |
| APPLICATION NO. | : 10/413225 |
| DATED | : March 6, 2007 |
| INVENTOR(S) | : Youiti Morimoto et al. |

It is certified that error appears in the above-identified patent and that said Letters Patent is hereby corrected as shown below:

Column 32, Table 15, change

"
| Inputted character | Conversion candidate | Time band | Signification |
|---|---|---|---|
| N | 你好 | Morning | Good morning |
| N | 你吃了吗? | Noon | Didn't you have a lunch |
| N | 你还没睡吗? | Night | Aren't you asleep yet? |
| N | 你早点睡吧! | Midnight | How about sleeping? |

" to

--
| Inputted character | Conversion candidate | Time band | Signification |
|---|---|---|---|
| N | 你好 | Morning | Good morning |
| N | 你吃了吗? | Noon | Didn't you have a lunch? |
| N | 你还没睡吗? | Night | Aren't you asleep yet? |
| N | 你早点睡吧! | Midnight | How about sleeping? |

--.

Column 36, Line 58, after "program" insert --product--.

Column 36, Line 62, before "program" insert --computer--.

Signed and Sealed this

Twenty-eighth Day of August, 2007

JON W. DUDAS
*Director of the United States Patent and Trademark Office*